(12) United States Patent
Jacobs et al.

(10) Patent No.: US 6,581,088 B1
(45) Date of Patent: Jun. 17, 2003

(54) SMART STUB OR ENTERPRISE JAVA™ BEAN IN A DISTRIBUTED PROCESSING SYSTEM

(75) Inventors: Dean B. Jacobs, Berkeley, CA (US); Eric M. Halpern, San Francisco, CA (US)

(73) Assignee: Beas Systems, Inc., San Jose, CA (US)

( * ) Notice: Subject to any disclaimer, the term of this patent is extended or adjusted under 35 U.S.C. 154(b) by 0 days.

(21) Appl. No.: 09/405,260

(22) Filed: Sep. 23, 1999

Related U.S. Application Data

(60) Provisional application No. 60/107,167, filed on Nov. 5, 1998.

(51) Int. Cl.$^7$ .................................................. G06F 9/00
(52) U.S. Cl. ........................ 709/105; 709/100; 709/203
(58) Field of Search ................................ 709/100, 102, 709/103, 104, 107, 108, 310, 315, 316, 317, 328, 318, 319

(56) References Cited

U.S. PATENT DOCUMENTS

| | | | |
|---|---|---|---|
| 5,465,365 A | 11/1995 | Winterbottom | 707/104 |
| 5,475,819 A | 12/1995 | Miller et al. | 395/200.03 |
| 5,564,070 A | 10/1996 | Want et al. | 455/53.1 |
| 5,623,666 A | 4/1997 | Pike et al. | 707/200 |
| 5,692,180 A | 11/1997 | Lee | 707/10 |
| 5,701,484 A | 12/1997 | Artsy | 709/242 |
| 5,701,502 A | 12/1997 | Baker et al. | 709/201 |
| 5,764,982 A | 6/1998 | Madduri | 707/10 |
| 5,774,660 A * | 6/1998 | Brendel et al. | 395/200.31 |
| 5,790,548 A | 8/1998 | Sistanizadeh et al. | 707/10 |
| 5,794,006 A | 8/1998 | Sanderman | 707/10 |
| 5,805,804 A | 9/1998 | Laursen et al. | 395/200.02 |
| 5,819,019 A | 10/1998 | Nelson | 707/10 |
| 5,819,044 A | 10/1998 | Kawabe et al. | 395/200.56 |
| 5,842,219 A | 11/1998 | High, Jr. et al. | 707/103 |
| 5,850,449 A | 12/1998 | McManis | 703/161 |
| 5,862,331 A | 1/1999 | Herriot | 395/200.49 |
| 5,901,227 A | 5/1999 | Perlman | 380/21 |
| 5,961,582 A | 10/1999 | Gaines | 709/1 |
| 5,966,702 A | 10/1999 | Fresko et al. | 707/1 |
| 5,974,441 A | 10/1999 | Rogers et al. | 709/200 |
| 5,983,233 A | 11/1999 | Potonniee | 707/103 |
| 5,983,351 A | 11/1999 | Glogau | 713/201 |
| 5,999,988 A | 12/1999 | Pelegri-Llopart et al. | 709/330 |
| 6,003,065 A | 12/1999 | Yan et al. | 709/201 |
| 6,006,264 A * | 12/1999 | Colby et al. | 709/226 |
| 6,016,505 A | 1/2000 | Badovinatz et al. | 709/205 |
| 6,144,944 A * | 11/2000 | Kurtzman, II et al. | 705/14 |

OTHER PUBLICATIONS

Brewing Distributed Applications With Java ORB Tools, Dec. 1996.*

Sun Microsystems, JavaBeans, Graham Hamilton, Jul. 1997.*

* cited by examiner

Primary Examiner—Majid Banankhah
(74) Attorney, Agent, or Firm—Fliesler, Dubb, Meyer & Lovejoy LLP

(57) ABSTRACT

A clustered enterprise Java™ distributed processing system is provided. The distributed processing system includes a first and a second computer coupled to a communication medium. The first computer includes a Java™ virtual machine (JVM) and kernel software layer for transferring messages, including a remote Java™ virtual machine (RJVM). The second computer includes a JVM and a kernel software layer having a RJVM. Messages are passed from a RJVM to the JVM in one computer to the JVM and RJVM in the second computer. Messages may be forwarded through an intermediate server or rerouted after a network reconfiguration. Each computer includes a Smart stub having a replica handler, including a load balancing software component and a failover software component. Each computer includes a duplicated service naming tree for storing a pool of Smart stubs at a node. The computers may be programmed in a stateless, stateless factory, or a stateful programming model. The clustered enterprise Java™ distributed processing system allows for enhanced scalability and fault tolerance.

74 Claims, 16 Drawing Sheets

JAVA ENTERPRISE APIs 100

Remote Method Invocation
(RMI) 100a (Peer-to-peer Architecture)

Enterprise Java Beans
(EJBs) 100b (Multi-tier Architecture)

Java Naming and Directory
Interface (JNDI) 100c

FIG. 1b  (PRIOR ART)

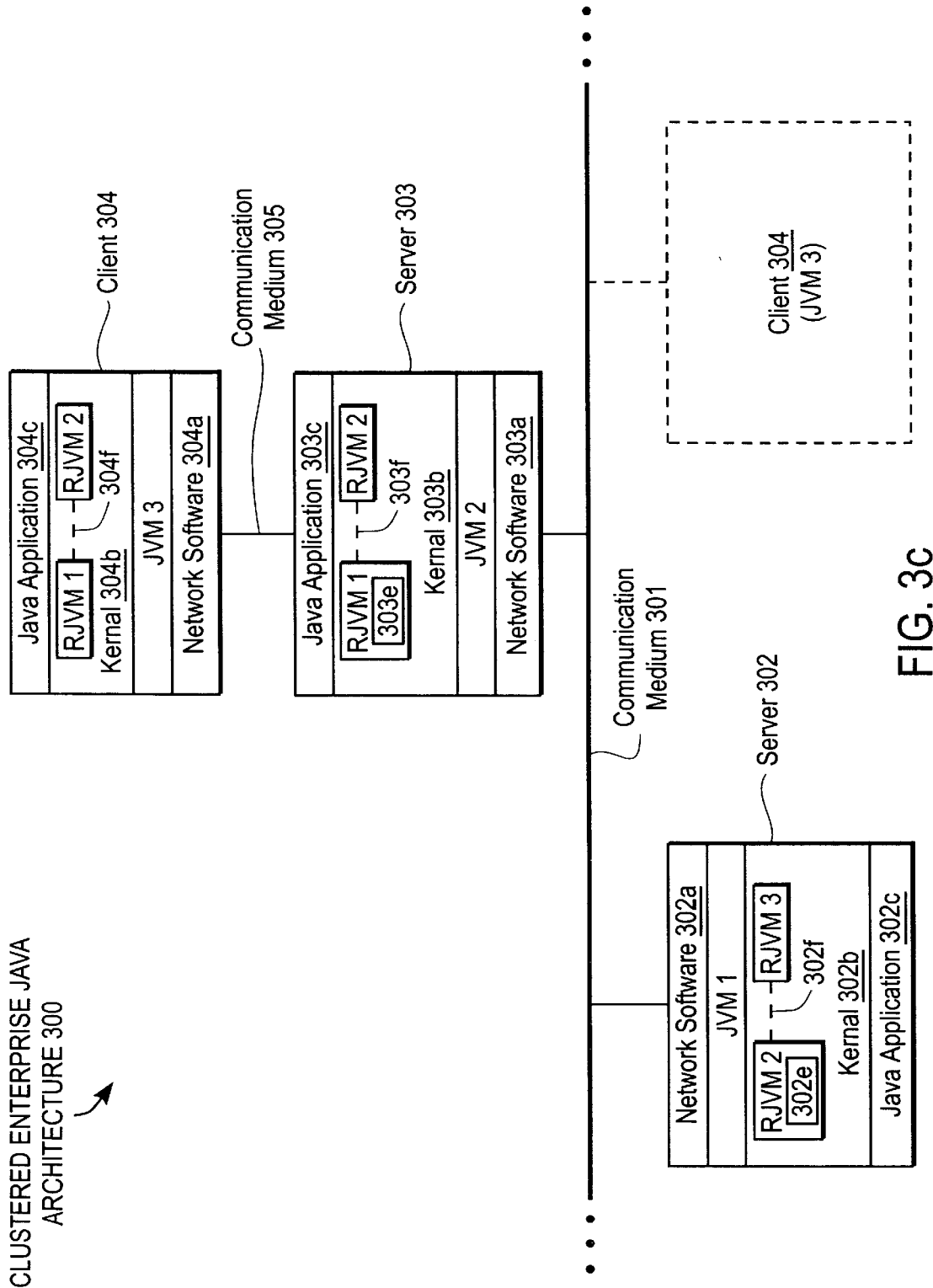

US 6,581,088 B1

SMART STUB OR ENTERPRISE JAVA™ BEAN IN A DISTRIBUTED PROCESSING SYSTEM

CROSS REFERENCE TO RELATED APPLICATIONS

This application claims the benefit of U.S. Provisional Application No. 60/107,167, filed Nov. 5, 1998.

The following copending U.S. patent applications are assigned to the assignee of the present application, and their disclosures are incorporated herein by reference:

(A) Ser. No. 09/405,318 filed Sep. 23, 1999 by Dean B. Jacobs and Anno R. Langen, and originally entitled, "CLUSTERED ENTERPRISE JAVA™ HAVING A MESSAGE PASSING KERNEL IN A DISTRIBUTED PROCESSING SYSTEM";

(B) Ser. No. 09/405,508 filed Sep. 23, 1999 by Dean B. Jacobs and Eric M. Halpern, and entitled, "A DUPLICATED NAMING SERVICE IN A DISTRIBUTED PROCESSING SYSTEM"; and (C) Ser. No. 09/405,500 filed Sep. 23, 1999 by Dean B. Jacobs and Anno R. Langen, and originally entitled, "CLUSTERED ENTERPRISE JAVA™ IN A SECURE DISTRIBUTED PROCESSING SYSTEM".

FIELD OF THE INVENTION

The present invention relates to distributed processing systems and, in particular, computer software in distributed processing systems.

BACKGROUND OF THE INVENTION

There are several types of distributed processing systems. Generally, a distributed processing system includes a plurality of processing devices, such as two computers coupled to a communication medium. Communication mediums may include wired mediums, wireless mediums, or combinations thereof, such as an Ethernet local area network or a cellular network. In a distributed processing system, at least one processing device may transfer information on the communication medium to another processing device.

Client/server architecture 110 illustrated in FIG. 1a is one type of distributed processing system. Client/server architecture 110 includes at least two processing devices, illustrated as client 105 and application server 103. Additional clients may also be coupled to communication medium 104, such as client 108.

Typically, server 103 hosts business logic and/or coordinates transactions in providing a service to another processing device, such as client 103 and/or client 108. Application server 103 is typically programmed with software for providing a service. The software may be programmed using a variety of programming models, such as Enterprise Java™ Bean ("EJB") 100b as illustrated in FIGS. 1a–b. The service may include, for example, retrieving and transferring data from a database, providing an image and/or calculating an equation. For example, server 103 may retrieve data from database 101a in persistent storage 101 over communication medium 102 in response to a request from client 105. Application server 103 then may transfer the requested data over communication medium 104 to client 105.

A client is a processing device which utilizes a service from a server and may request the service. Often a user 106 interacts with client 106 and may cause client 105 to request service over a communication medium 104 from application server 103. A client often handles direct interactions with end users, such as accepting requests and displaying results.

A variety of different types of software may be used to program application server 103 and/or client 105. One programming language is the Java™ programming language. Java™ application object code is loaded into a Java™ virtual machine ("JVM"). A JVM is a program loaded onto a processing device which emulates a particular machine or processing device. More information on the Java™ programming language may be obtained at http://www.javasoft.com, which is incorporated by reference herein.

FIG. 1b illustrates several Java™ Enterprise Application Programming Interfaces ("APIs") 100 that allow Java™ application code to remain independent from underlying transaction systems, data-bases and network infrastructure. Java™ Enterprise APIs 100 include, for example, remote method invocation ("RMI") 100a, EJBs 100b, and Java™ Naming and Directory Interface (JNDI) 100c.

RMI 100a is a distributed programming model often used in peer-to-peer architecture described below. In particular, a set of classes and interfaces enables one Java™ object to call the public method of another Java™ object running on a different JVM.

An instance of EJB 100b is typically used in a client/server architecture described above. An instance of EJB 100b is a software component or a reusable pre-built piece of encapsulated application code that can be combined with other components. Typically, an instance of EJB 100b contains business logic. An EJB 100b instance stored on server 103 typically manages persistence, transactions, concurrency, threading, and security.

JNDI 100c provides directory and naming functions to Java™ software applications.

Client/server architecture 110 has many disadvantages. First, architecture 110 does not scale well because server 103 has to handle many connections. In other words, the number of clients which may be added to server 103 is limited. In addition, adding twice as many processing devices (clients) does not necessarily provide you with twice as much performance. Second, it is difficult to maintain application code on clients 105 and 108. Third, architecture 110 is susceptible to system failures or a single point of failure. If server 101 fails and a backup is not available, client 105 will not be able to obtain the service.

FIG. 1c illustrates a multi-tier architecture 160. Clients 151, 152 manage direct interactions with end users, accepting requests and display results. Application server 153 hosts the application code, coordinates communications, synchronizations, and transactions. Database server 154 and portable storage device 155 provides durable transactional management of the data.

Multi-tier architecture 160 has similar client/server architecture 110 disadvantages described above.

FIG. 2 illustrates peer-to-peer architecture 214. Processing devices 216, 217 and 218 are coupled to communication medium 213. Processing devices 216, 217, and 218 include network software 210a, 210b, and 210c for communicating over medium 213. Typically, each processing device in a peer-to-peer architecture has similar processing capabilities and applications. Examples of peer-to-peer program models include Common Object Request Broker Architecture ("CORBA") and Distributed Object Component Model ("DCOM") architecture.

In a platform specific distributed processing system, each processing device may run the same operating system. This allows the use of proprietary hardware, such as shared disks, multi-tailed disks, and high speed interconnects, for communicating between processing devices. Examples of platform-specific distributed processing systems include IBM® Corporation's S/390® Parallel Sysplex®, Compaq's Tandem Division Himalaya servers, Compaq's Digital Equipment Corporation™ (DEC™) Division OpenVMS™ Cluster software, and Microsoft® Corporation Windows NT® cluster services (Wolfpack).

FIG. 2b illustrates a transaction processing (TP) architecture 220. In particular, TP architecture 220 illustrates a BEA® Systems, Inc. TUXEDO® architecture. TP monitor 224 is coupled to processing devices ATM 221, PC 222, and TP monitor 223 by communication medium 280, 281, and 282, respectively. ATM 221 may be an automated teller machine, PC 222 may be a personal computer, and TP monitor 223 may be another transaction processor monitor. TP monitor 224 is coupled to back-end servers 225, 226, and 227 by communication mediums 283, 284, and 285. Server 225 is coupled to persistent storage device 287, storing database 289, by communication medium 286. TP monitor 224 includes a workflow controller 224a for routing service requests from processing devices, such as ATM 221, PC 222, or TP monitor 223, to various servers such as server 225, 226 and 227. Work flow controller 224a enables (1) workload balancing between servers, (2) limited scalability or allowing for additional servers and/or clients, (3) fault tolerance of redundant backend servers (or a service request may be sent by a workflow controller to a server which has not failed), and (4) session concentration to limit the number of simultaneous connections to back-end servers. Examples of other transaction processing architectures include IBM® Corporation's CICS®, Compaq's Tandem Division Pathway/Ford/TS, Compaq's DEC™ ACMS, and Transarc Corporation's Encina.

TP architecture 220 also has many disadvantages. First, a failure of a single processing device or TP monitor 224 may render the network inoperable. Second, the scalability or number of processing devices (both servers and clients) coupled to TP monitor 224 may be limited by TP monitor 224 hardware and software. Third, flexibility in routing a client request to a server is limited. For example, if communication medium 280 is inoperable, but communication medium 290 becomes available, ATM 221 typically may not request service directly from server 225 over communication medium 290 and must access TP monitor 224. Fourth, a client typically does not know the state of a back-end server or other processing device. Fifth, no industry standard software or APIs are used for load balancing. And sixth, a client typically may not select a particular server even if the client has relevant information which would enable efficient service.

Therefore, it is desirable to provide a distributed processing system and, in particular, distributed processing system software that has the advantages of the prior art distributed processing systems without the inherent disadvantages. The software should allow for industry standard APIs which are typically used in either client/server, multi-tier, or peer-to-peer distributed processing systems. The software should support a variety of computer programming models. Further, the software should enable (1) enhanced fault tolerance, (2) efficient scalability, (3) effective load balancing, and (4) session concentration control. The improved computer software should allow for rerouting or network reconfiguration. Also, the computer software should allow for the determination of the state of a processing device.

SUMMARY OF THE INVENTION

An improved distributed processing system is provided and, in particular, computer software for a distributed processing system is provided. The computer software improves the fault tolerance of the distributed processing system as well as enables efficient scalability. The computer software allows for efficient load balancing and session concentration. The computer software supports rerouting or reconfiguration of a computer network. The computer software supports a variety of computer programming models and allows for the use of industry standard APIs that are used in both client/server and peer-to-peer distributed processing architectures. The computer software enables a determination of the state of a server or other processing device. The computer software also supports message forwarding under a variety of circumstances, including a security model.

According to one aspect of the present invention, a distributed processing system comprises a communication medium coupled to a first processing device and a second processing device. The first processing device includes a first software program emulating a processing device ("JVM1") including a first kernel software layer having a data structure ("RJVM1"). The second processing device includes a first software program emulating a processing device ("JVM2") including a first kernel software layer having a data structure ("RJVM2"). A message from the first processing device is transferred to the second processing device through the first kernel software layer and the first software program in the first processing device to the first kernel software layer and the first software program in the second processing device.

According to another aspect of the present invention, the first software program in the first processing device is a Java™ virtual machine ("JVM") and the data structure in the first processing device is a remote Java™ virtual machine ("RJVM"). Similarly, the first software program in the second processing device is a JVM and the data structure in the second processing device is a RJVM. The RJVM in the second processing device corresponds to the JVM in the first processing device.

According to another aspect of the present invention, the RJVM in the first processing device includes a socket manager software component, a thread manager software component, a message routing software component, a message compression software component, and/or a peer-gone detection software component.

According to another aspect of the present invention, the first processing device communicates with the second processing device using a protocol selected from the group consisting of Transmission Control Protocol ("TCP"), Secure Sockets Layer ("SSL"), Hypertext Transport Protocol ("HTTP") tunneling, and Internet InterORB Protocol ("IIOP") tunneling.

According to another aspect of the present invention, the first processing device includes memory storage for a Java™ application.

According to another aspect of the present invention, the first processing device is a peer of the second processing device. Also, the first processing device is a server and the second processing device is a client.

According to another aspect of the present invention, a second communication medium is coupled to the second processing device. A third processing device is coupled to the second communication medium. The third processing device includes a first software program emulating a processing device ("JVM3"), including a kernel software layer having a first data structure ("RJVM1"), and a second data structure ("RJVM2").

According to still another aspect of the present invention, the first processing device includes a stub having a replicahandler software component. The replica-handler software component includes a load balancing software component and a failover software component.

According to another aspect of the present invention, the first processing device includes an Enterprise Java™ Bean object.

According to still another aspect of the present invention, the first processing device includes a naming tree having a pool of stubs stored at a node of the tree and the second processing device includes a duplicate of the naming tree.

According to still another aspect of the present invention, the first processing device includes an application program coded in a stateless program model and the application program includes a stateless session bean.

According to still another aspect of the present invention, the first processing device includes an application program coded in a stateless factory program model and the application program includes a stateful session bean.

According to still another aspect of the present invention, the first processing device includes an application program coded in a stateful program model and the application program includes an entity session bean.

According to still another aspect of the present invention, an article of manufacture including an information storage medium is provided. The article of manufacture comprises a first set of digital information for transferring a message from a RJVM in a first processing device to a RJVM in a second processing device.

According to another aspect of the present invention, the article of manufacture comprises a first set of digital information, including a stub having a load balancing software program for selecting a service provider from a plurality of service providers.

According to another aspect of the present invention, the stub has a failover software component for removing a failed service provider from the plurality of service providers.

According to another aspect of the present invention, the load balancing software component selects a service provider based on an affinity for a particular service provider.

According to another aspect of the present invention, the load balancing software component selects a service provider in a round robin manner.

According to another aspect of the present invention, the load balancing software component randomly selects a service provider.

According to another aspect of the present invention, the load balancing software component selects a service provider from the plurality of service providers based upon the load of each service provider.

According to another aspect of the present invention, the load balancing software component selects a service provider from the plurality of service providers based upon the data type requested.

According to another aspect of the present invention, the load balancing software component selects a service provider from the plurality of service providers based upon the closest physical service provider.

According to another aspect of the present invention, the load balancing software component selects a service provider from the plurality of service providers based upon a time period in which each service provider responds.

According to another aspect of the present invention, the article of manufacture comprises a first set of digital information, including an Enterprise Java™ Bean object for selecting a service provider from a plurality of service providers.

According to another aspect of the present invention, a stub is stored in a processing device in a distributed processing system. The stub includes a method comprising the steps of obtaining a list of service providers and selecting a service provider from the list of service providers.

According to another aspect of the present invention, the method further includes removing a failed service provider from the list of service providers.

According to still another aspect of the present invention, an apparatus comprises a communication medium coupled to a first processing device and a second processing device. The first processing device stores a naming tree including a remote method invocation ("RMI") stub for accessing a service provider. The second processing device has a duplicate naming tree and the service provider.

According to another aspect of the present invention, the naming tree has a node including a service pool of current service providers.

According to another aspect of the present invention, the service pool includes a stub.

According to another aspect of the present invention, a distributed processing system comprises a first computer coupled to a second computer. The first computer has a naming tree, including a remote invocation stub for accessing a service provider. The second computer has a replicated naming tree and the service provider.

According to another aspect of the present invention, a distributed processing system comprising a first processing device coupled to a second processing device is provided. The first processing device has a JVM and a first kernel software layer including a first RJVM. The second processing device includes a first JVM and a first kernel software layer including a second RJVM. A message may be transferred from the first processing device to the second processing device when there is not a socket available between the first JVM and the second JVM.

According to another aspect of the present invention, the first processing device is running under an applet security model, behind a firewall or is a client, and the second processing device is also a client.

Other aspects and advantages of the present invention can be seen upon review of the figures, the detailed description, and the claims which follow.

BRIEF DESCRIPTION OF THE FIGURES

FIG. 1b illustrates a prior art Java™ enterprise APIs;

FIG. 3b illustrates a simplified software block diagram of the kernel illustrated in FIG. 3a;

FIG. 3c illustrates a clustered enterprise Java™ architecture;

The invention will be better understood with reference to the drawings and detailed description below. In the drawings, like reference numerals indicate like components.

DETAILED DESCRIPTION

I. Clustered Enterprise Java™ Distributed Processing System

A. Clustered Enterprise Java™ Software Architecture

Figure 1A:
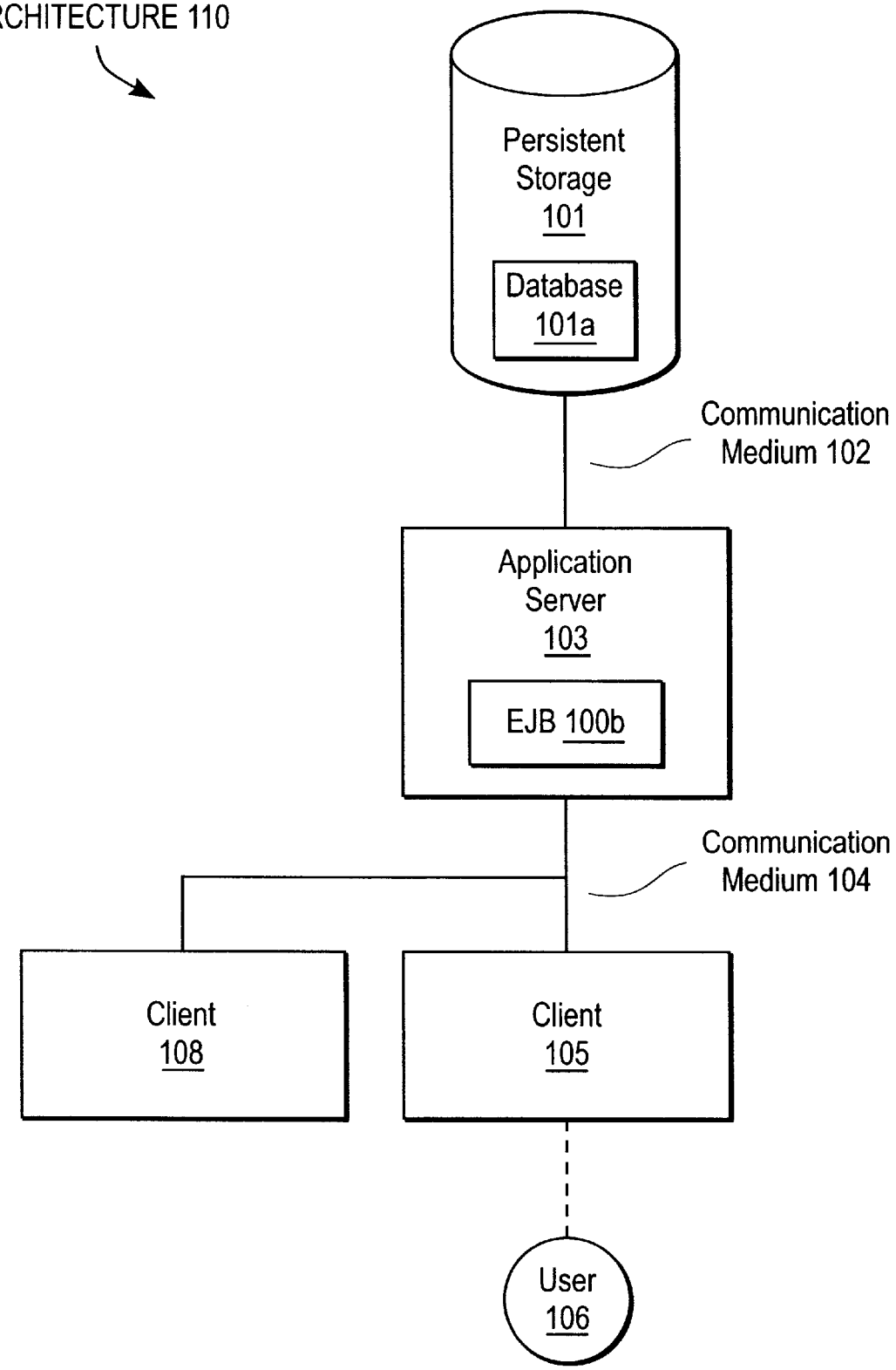
FIG. 1a illustrates a prior art client/server architecture.
Figure 1C:
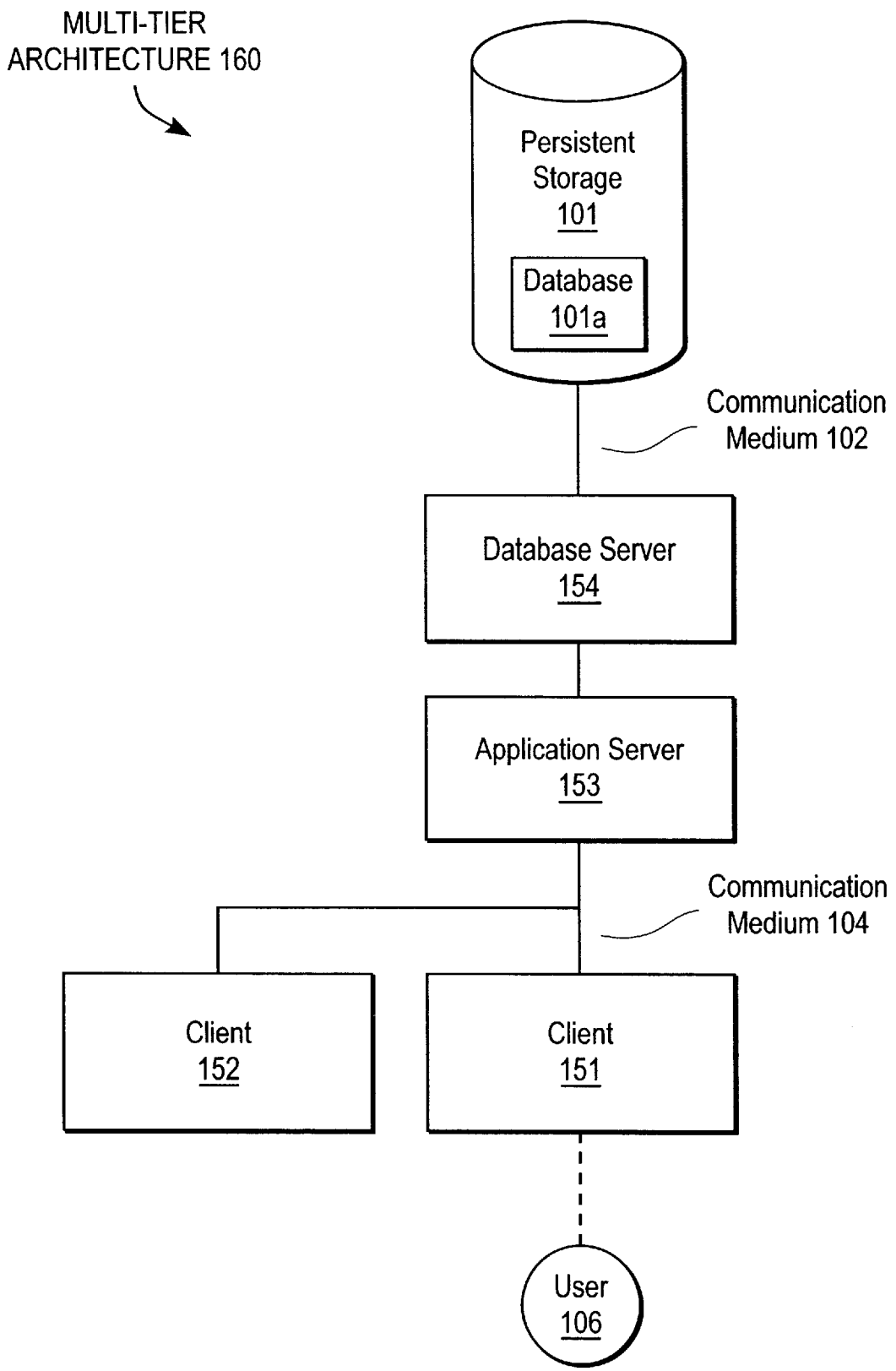
FIG. 1c illustrates a multi-tier architecture.
Figure 2A:
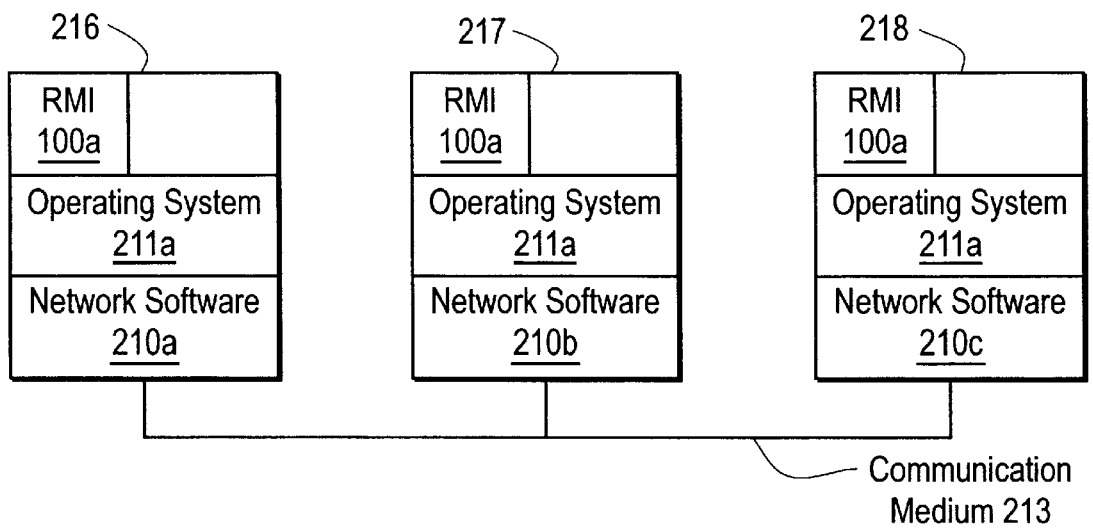
FIG. 2a illustrates a prior art peer-to-peer architecture.
Figure 2B:
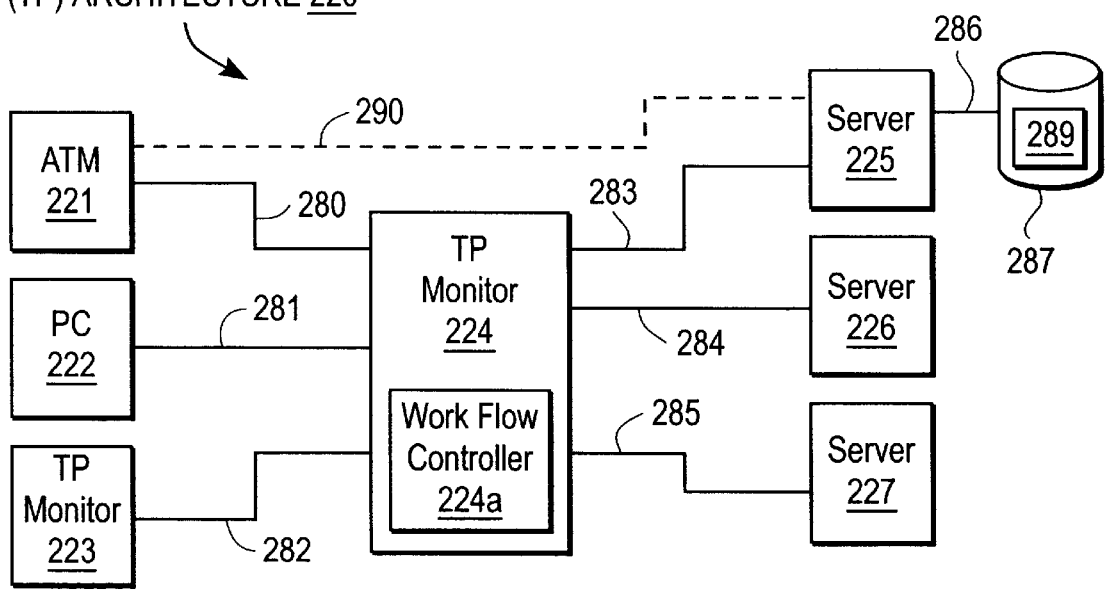
FIG. 2b illustrates a prior art transaction processing architecture.
Figure 3A:
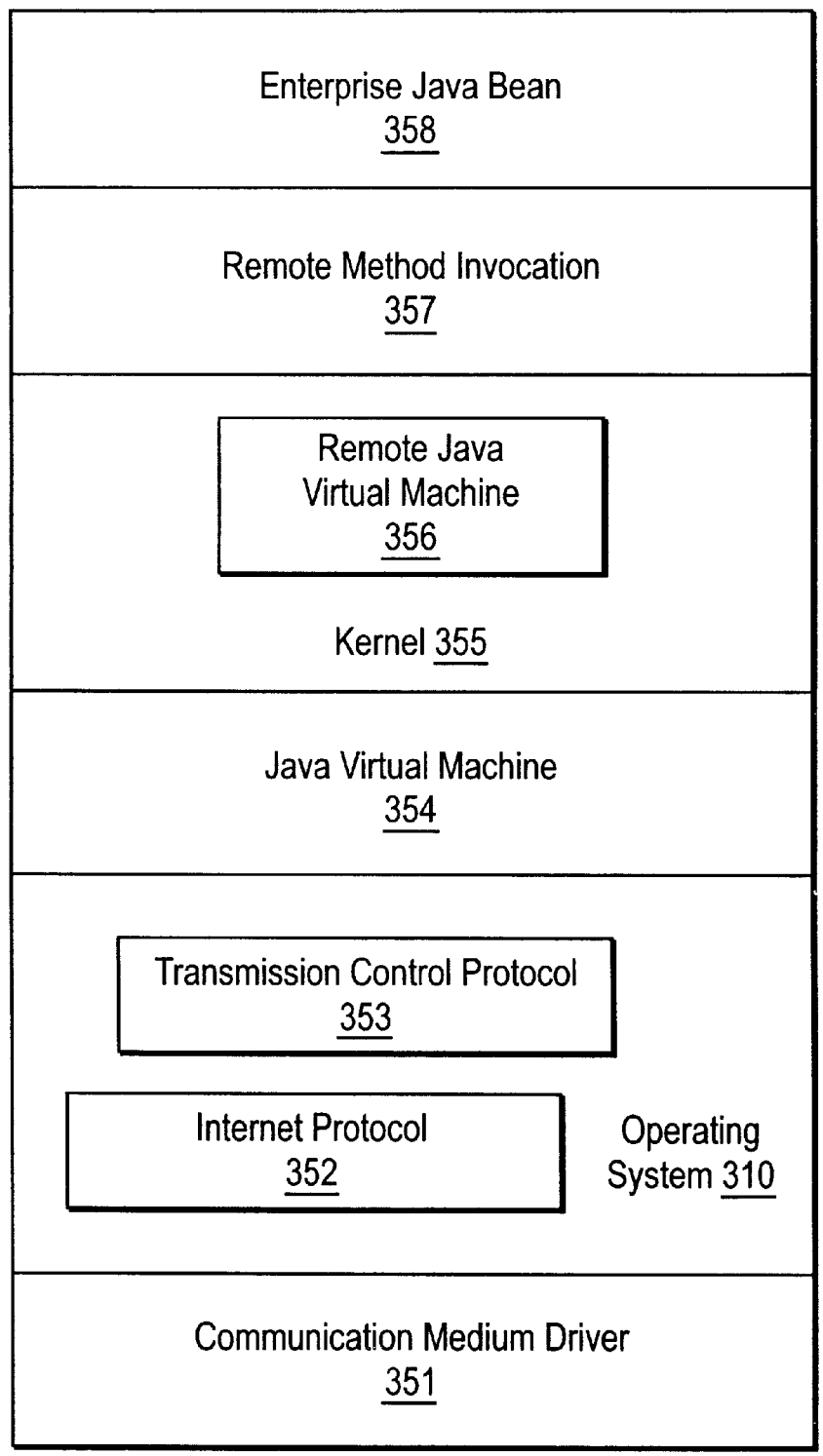
FIG. 3a illustrates a simplified software block diagram of an embodiment of the present invention.

FIG. 3a illustrates a simplified block diagram 380 of the software layers in a processing device of a clustered enterprise Java™ system, according to an embodiment of the present invention. A detailed description of a clustered enterprise Java™ distributed processing system is described below. The first layer of software includes a communication medium software driver 351 for transferring and receiving information on a communication medium, such as an ethernet local area network. An operating system 310 including a transmission control protocol ("TCP") software component 353 and internet protocol ("IP") software component 352 are upper software layers for retrieving and sending packages or blocks of information in a particular format. An "upper" software layer is generally defined as a software component which utilizes or accesses one or more "lower" software layers or software components. A JVM 354 is then implemented. A kernel 355 having a remote Java™ virtual machine 356 is then layered on JVM 354. Kernel 355, described in detail below, is used to transfer messages between processing devices in a clustered enterprise Java™ distributed processing system. Remote method invocation 357 and enterprise Java™ bean 358 are upper software layers of kernel 355. EJB 358 is a container for a variety of Java™ applications.

Figure 3B:
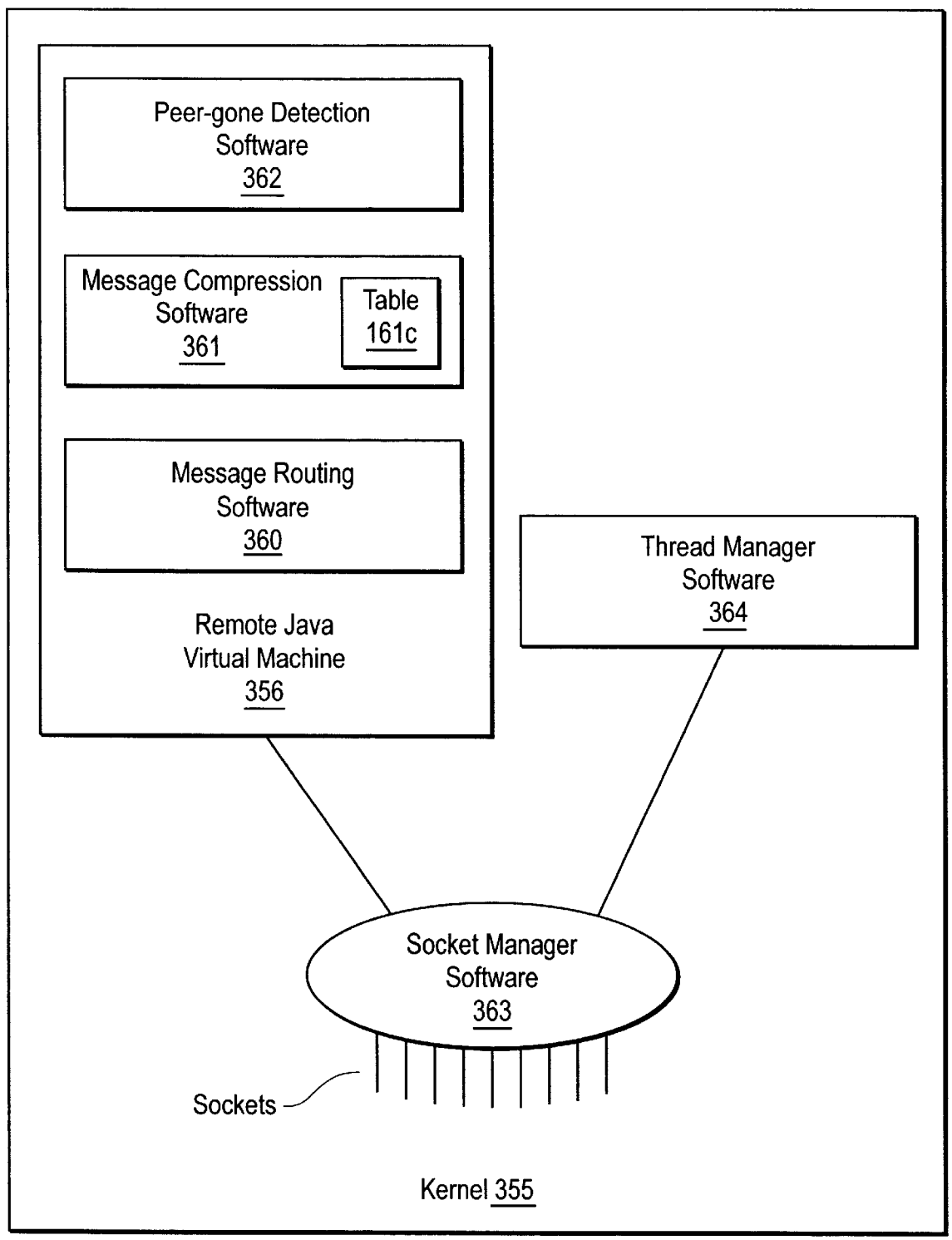

FIG. 3b illustrates a detailed view of kernel 355 illustrated in FIG. 3a. Kernel 355 includes a socket manager component 363, thread manager 364 component, and RJVM 356. RJVM 356 is a data structure including message routing software component 360, message compression software component 361 including abbreviation table 161c, and peer-gone detection software component 362. RJVM 356 and thread manager component 364 interact with socket manager component 363 to transfer information between processing devices.

B. Distributed Processing System

FIG. 3 illustrates a simplified block diagram of a clustered enterprise Java™ distributed processing system 300. Processing devices are coupled to communication medium 301. Communication medium 301 may be a wired and/or wireless communication medium or combination thereof. In an embodiment, communication medium 301 is a local-area-network (LAN). In an alternate embodiment, communication medium 301 is a world-area-network (WAN) such as the Internet or World Wide Web. In still another embodiment, communication medium 301 is both a LAN and a WAN.

Figure 8:
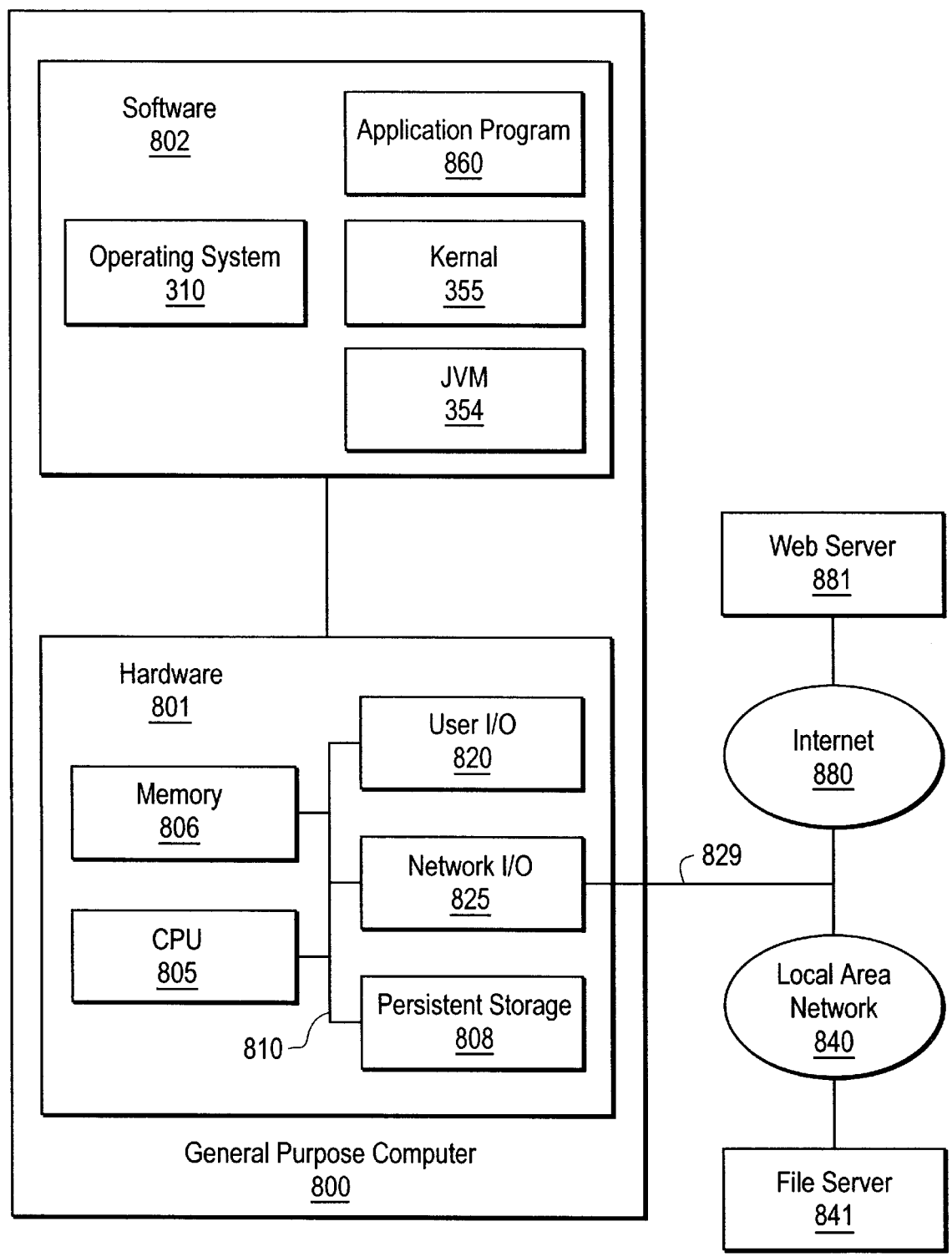
FIG. 8 illustrates hardware and software components of a client/server in the clustered enterprise Java™ architecture shown in FIGS. 3–5.

A variety of different types of processing devices may be coupled to communication medium 301. In an embodiment, a processing device may be a general purpose computer 100 as illustrated in FIG. 8 and described below. One of ordinary skill in the art would understand that FIG. 8 and the below description describes one particular type of processing device where multiple other types of processing devices with a different software and hardware configurations could be utilized in accordance with an embodiment of the present invention. In an alternate embodiment, a processing device may be a printer, handheld computer, laptop computer, scanner, cellular telephone, pager, or equivalent thereof.

FIG. 3c illustrates an embodiment of the present invention in which servers 302 and 303 are coupled to communication medium 301. Server 303 is also coupled to communication medium 305 which may have similar embodiments as described above in regard to communication medium 301. Client 304 is also coupled to communication medium 305. In an alternate embodiment, client 304 may be coupled to communication medium 301 as illustrated by the dashed line and box in FIG. 3c. It should be understood that in alternate embodiments, server 302 is (1) both a client and a server, or (2) a client. Similarly, FIG. 3 illustrates an embodiment in which three processing devices are shown wherein other embodiments of the present invention include multiple other processing devices or communication mediums as illustrated by the ellipses.

Server 302 transfers information over communication medium 301 to server 303 by using network software 302a and network software 303a, respectively. In an embodiment, network software 302a, 303a, and 304a include communication medium software driver 351, Transmission Control Protocol software 353, and Internet Protocol software 352 ("TCP/IP"). Client 304 also includes network software 304a for transferring information to server 303 over communication medium 305. Network software 303a in server 303 is also used to transfer information to client 304 by way of communication medium 305.

According to an embodiment of the present invention, each processing device in clustered enterprise Java™ architecture 300 includes a message-passing kernel 355 that supports both multi-tier and peer-to-peer functionality. A kernel is a software program used to provide fundamental services to other software programs on a processing device.

In particular, server 302, server 303, and client 304 have kernels 302b, 303b, and 304b, respectively. In particular, in order for two JVMs to interact, whether they are clients or servers, each JVM constructs an RJVM representing the other. Messages are sent from the upper layer on one side, through a corresponding RJVM, across the communication medium, through the peer RJVM, and delivered to the upper layer on the other side. In various embodiments, messages can be transferred using a variety of different protocols, including, but not limited to, Transmission Control Protocol/Internet Protocol ("TCP/IP"), Secure Sockets Layer ("SSL"), Hypertext Transport Protocol ("HTTP") tunneling, and Internet InterORB Protocol ("IIOP") tunneling, and combinations thereof. The RJVMs and socket managers create and maintain the sockets underlying these protocols and share them between all objects in the upper layers. A socket is a logical location representing a terminal between processing devices in a distributed processing system. The kernel maintains a pool of execute threads and thread manager software component 364 multiplexes the threads between socket reading and request execution. A thread is a sequence of executing program code segments or functions.

For example, server 302 includes JVM1 and Java™ application 302c. Server 302 also includes a RJVM2 representing the JVM2 of server 303. If a message is to be sent from server 302 to server 303, the message is sent through RJVM2 in server 302 to RJVM1 in server 303.

C. Message Forwarding

Clustered enterprise Java™ network 300 is able to forward a message through an intermediate server. This functionality is important if a client requests a service from a back-end server through a front-end gateway. For example, a message from server 302 (client 302) and, in particular, JVM1 may be forwarded to client 304 (back-end server 304) or JVM3 through server 303 (front-end gateway) or JVM2. This functionality is important in controlling session concentration or how many connections are established between a server and various clients.

Further, message forwarding may be used in circumstances where a socket cannot be created between two JVMs. For example, a sender of a message is running under the applet security model which does not allow for a socket to be created to the original server. A detailed description of the applet security model is provided at http//:www.javasoft.com, which is incorporated herein by reference. Another example includes when the receiver of the message is behind a firewall. Also, as described below, message forwarding is applicable if the sender is a client and the receiver is a client and thus does not accept incoming sockets.

For example, if a message is sent from server 302 to client 304, the message would have to be routed through server 303. In particular, a message handoff, as illustrated by 302f, between RJVM3 (representing client 304) would be made to RJVM2 (representing server 303) in server 302. The message would be transferred using sockets 302e between RJVM2 in server 302 and RJVM1 in server 303. The message would then be handed off, as illustrated by dashed line 303f, from RJVM1 to RJVM3 in server 303. The message would then be passed between sockets of RJVM3 in server 303 and RJVM2 in client 304. The message then would be passed, as illustrated by the dashed line 304f, from RJVM2 in client 304 to RJVM1 in client 304.

D. Rerouting

An RJVM in client/server is able to switch communication paths or communication mediums to other RJVMs at any time. For example, if client 304 creates a direct socket to server 302, server 302 is able to start using the socket instead of message forwarding through server 303. This embodiment is illustrated by a dashed line and box representing client 304. In an embodiment, the use of transferring messages by RJVMs ensures reliable, in-order message delivery after the occurrence of a network reconfiguration. For example, if client 304 was reconfigured to communication medium 301 instead of communication medium 305 as illustrated in FIG. 3. In an alternate embodiment, messages may not be delivered in order.

An RJVM performs several end-to-end operations that are carried through routing. First, an RJVM is responsible for detecting when a respective client/server has unexpectedly died. In an embodiment, peer-gone selection software component 362, as illustrated in FIG. 3b, is responsible for this function. In an embodiment, an RJVM sends a heartbeat message to other clients/servers when no other message has been sent in a predetermined time period. If the client/server does not receive a heartbeat message in the predetermined count time, a failed client/server which should have sent the heartbeat, is detected. In an embodiment, a failed client/server is detected by connection timeouts or if no messages have been sent by the failed client/server in a predetermined amount of time. In still another embodiment, a failed socket indicates a failed server/client.

Second, during message serialization, RJVMs, in particular, message compression software 360, abbreviate commonly transmitted data values to reduce message size. To accomplish this, each JVM/RJVM pair maintains matching abbreviation tables. For example, JVM1 includes an abbreviation table and RJVM1 includes a matching abbreviation table. During message forwarding between an intermediate server, the body of a message is not deserialized on the intermediate server in route.

E. Multi-tier/Peer-to-Peer Functionality

Clustered enterprise Java™ architecture 300 allows for multitier and peer-to-peer programming.

Clustered enterprise Java™ architecture 300 supports an explicit syntax for client/server programming consistent with a multitier distributed processing architecture. As an example, the following client-side code fragment writes an informational message to a server's log file:

T3Client clnt=new T3Client("t3://acme:7001");

LogServices log=clnt.getT3Services( ).log( );

log.info("Hello from a client");

The first line establishes a session with the acme server using the t3 protocol. If RJVMs do not already exist, each JVM constructs an RJVM for the other and an underlying TCP socket is established. The client-side representation of this session—the T3Client object—and the server-side representation communicate through these RJVMs. The server-side supports a variety of services, including database access, remote file access, workspaces, events, and logging. The second line obtains a LogServices object and the third line writes the message.

Clustered enterprise Java™ computer architecture 300 also supports a server-neutral syntax consistent with a peer-to-peer distributed processing architecture. As an example, the following code fragment obtains a stub for an RMI object from the JNDI-compliant naming service on a server and invokes one of its methods.

Hashtable env=new Hashtable( );

env.put(Context.PROVIDER_URL, "t3://acme:7001");

env.put(Context.INITIAL_CONTEXT_FACTORY, "weblogic.jndi.WebLogicinitialContextFactory");

Context ctx=new InitialContext(env);

Example e=(Example) ctx.lookup("acme.eng.example");

result=e.example(37);

In an embodiment, JNDI naming contexts are packaged as RMI objects to implement remote access. Thus, the above code illustrates a kind of RMI bootstrapping. The first four lines obtain an RMI stub for the initial context on the acme server. If RJVMs do not already exist, each side constructs an RJVM for the other and an underlying TCP socket for the t3 protocol is established. The caller-side object—the RMI stub—and the callee-side object—an RMI impl—communicate through the RJVMs. The fifth line looks up another RMI object, an Example, at the name acme.eng.example and the sixth line invokes one of the Example methods. In an embodiment, the Example impl is not on the same processing device as the naming service. In another embodiment, the Example impl is on a client. Invocation of the Example object leads to the creation of the appropriate RJVMs if they do not already exist.

II. Replica-Aware or Smart Stubs/EJB Objects

In FIG. 3c, a processing device is able to provide a service to other processing devices in architecture 300 by replicating RMI and/or EJB objects. Thus, architecture 300 is easily scalable and fault tolerant. An additional service may easily be added to architecture 300 by adding replicated RMI and/or EJB objects to an existing processing device or newly added processing device. Moreover, because the RMI and/or EJB objects can be replicated throughout architecture 300, a single processing device, multiple processing devices, and/or a communication medium may fail and still not render architecture 300 inoperable or significantly degraded.

Figure 5A:
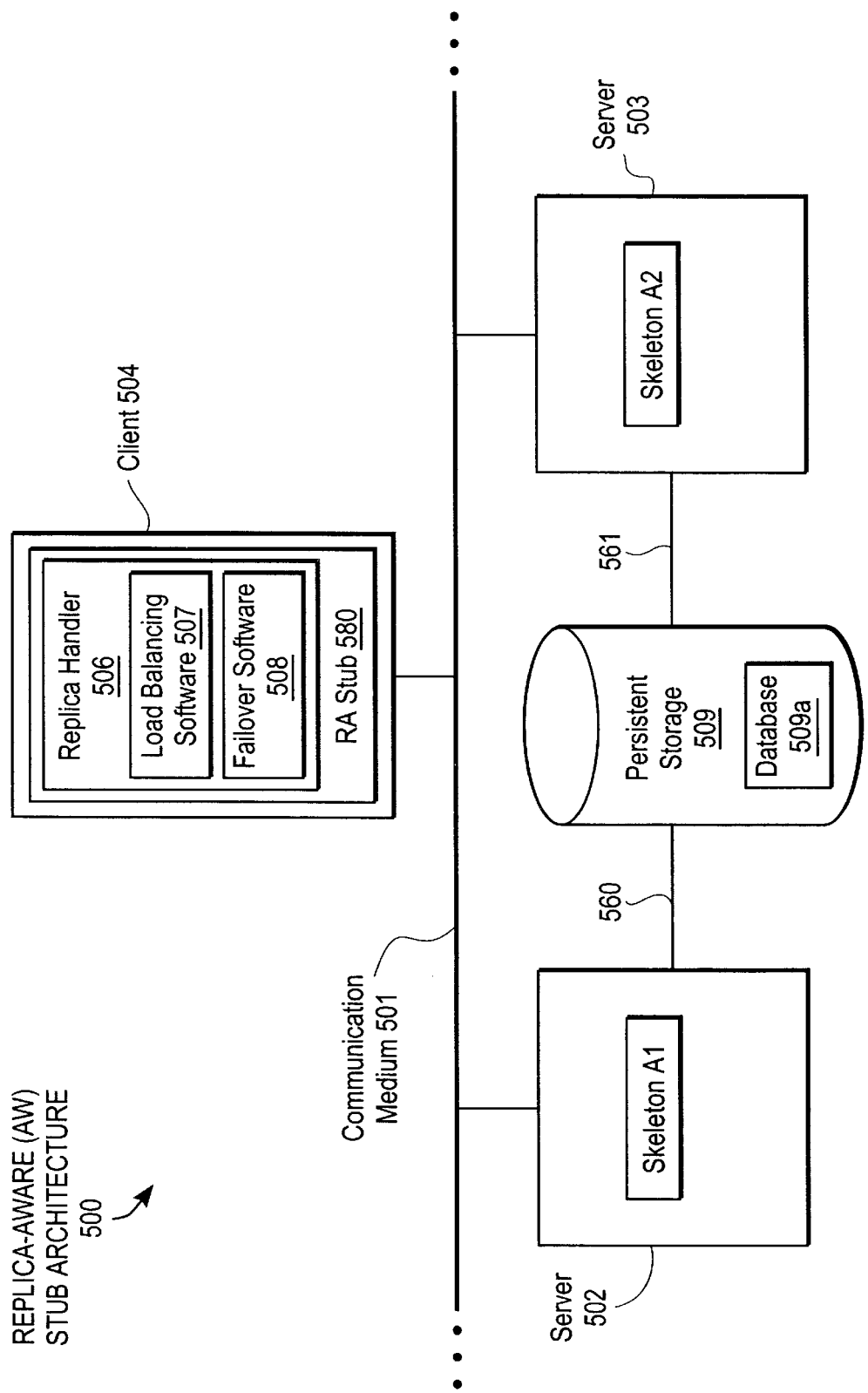
FIG. 5a illustrates a smart stub architecture.

FIG. 5a illustrates a replica-aware ("RA") or Smart stub 580 in architecture 500. Architecture 500 includes client 504 coupled to communication medium 501. Servers 502 and 503 are coupled to communication medium 501, respectively. Persistent storage device 509 is coupled to server 502 and 503 by communication medium 560 and 561, respectively. In various embodiments, communication medium 501, 560, and 561 may be wired and/or wireless communication mediums as described above. Similarly, in an embodiment, client 504, server 502, and server 503 may be both clients and servers as described above. One of ordinary skill in the art would understand that in alternate embodiments, multiple other servers and clients may be included in architecture 500 as illustrated by ellipses. Also, as stated above, in alternate embodiments, the hardware and software configuration of client 504, server 502 and server 503 is described below and illustrated in FIG. 8.

RA RMI stub 580 is a Smart stub which is able to find out about all of the service providers and switch between them based on a load balancing method 507 and/or failover method 508. In an embodiment, an RA stub 580 includes a replica handler 506 that selects an appropriate load balancing method 507 and/or failover method 507. In an alternate embodiment, a single load balancing method and/or single failover method is implemented. In alternate embodiments, replica handler 506 may include multiple load balancing methods and/or multiple failover methods and combinations thereof. In an embodiment, a replica handler 506 implements the following interface:

```
public interface ReplicaHandler {
    Object loadBalance(Object currentProvider) throws
    RefreshAbortedException;
    Object failOver(Object failedProvider,
    RemoteException e) throws
    RemoteException;
}
```

Immediately before invoking a method, RA stub 580 calls load balance method 507, which takes the current server and returns a replacement. For example, client 504 may be using server 502 for retrieving data for database 509a or personal storage device 509. Load balance method 507 may switch to server 503 because server 502 is overloaded with service requests. Handler 506 may choose a server replacement entirely on the caller, perhaps using information about server 502 load, or handler 506 may request server 502 for retrieving a particular type of data. For example, handler 506 may select a particular server for calculating an equation because the server has enhanced calculation capability. In an embodiment, replica handler 506 need not actually switch providers on every invocation because replica handler 506 is trying to minimize the number of connections that are created.

Figure 5B:
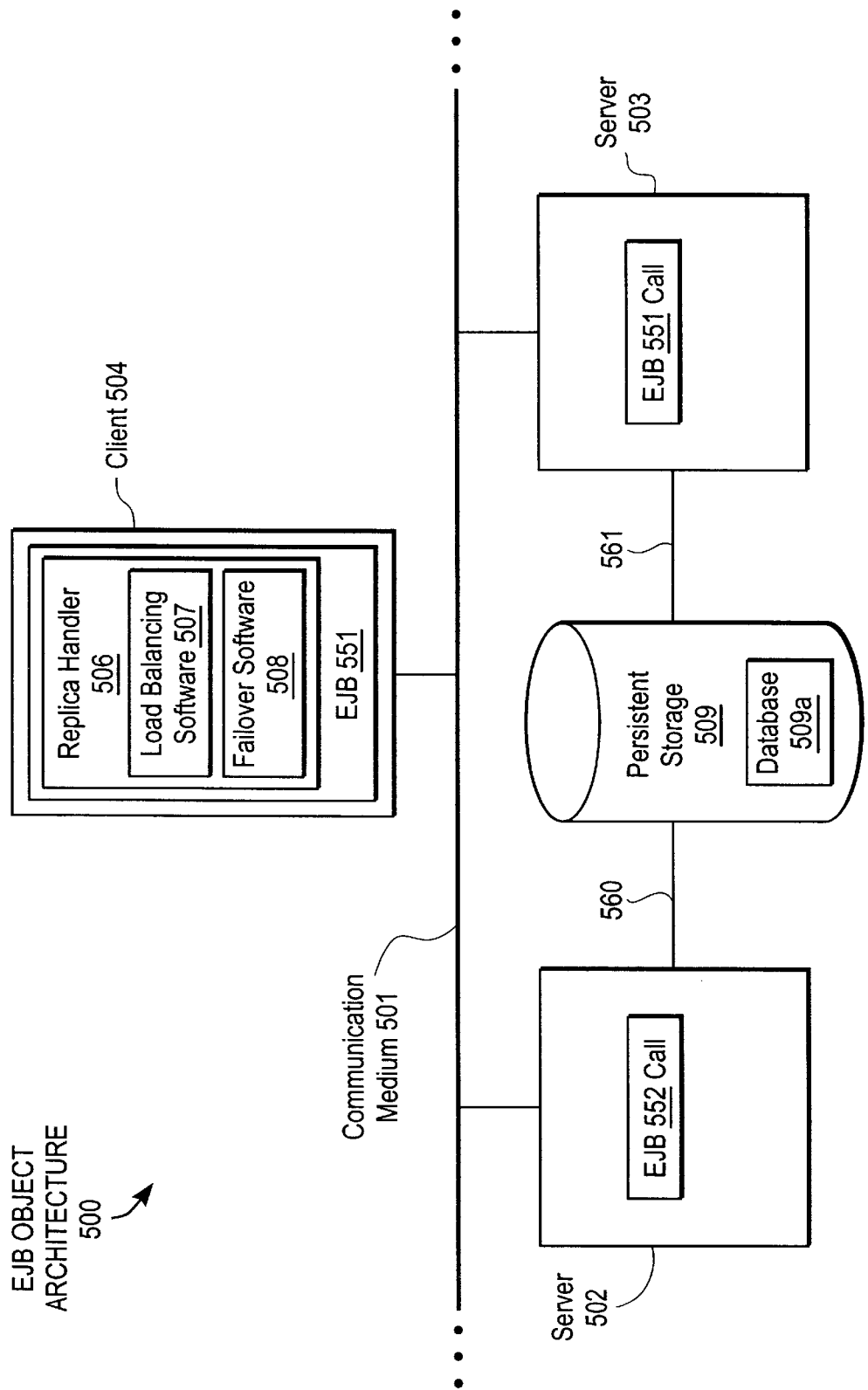
FIG. 5b illustrates an EJB object architecture.
Figure 6A:
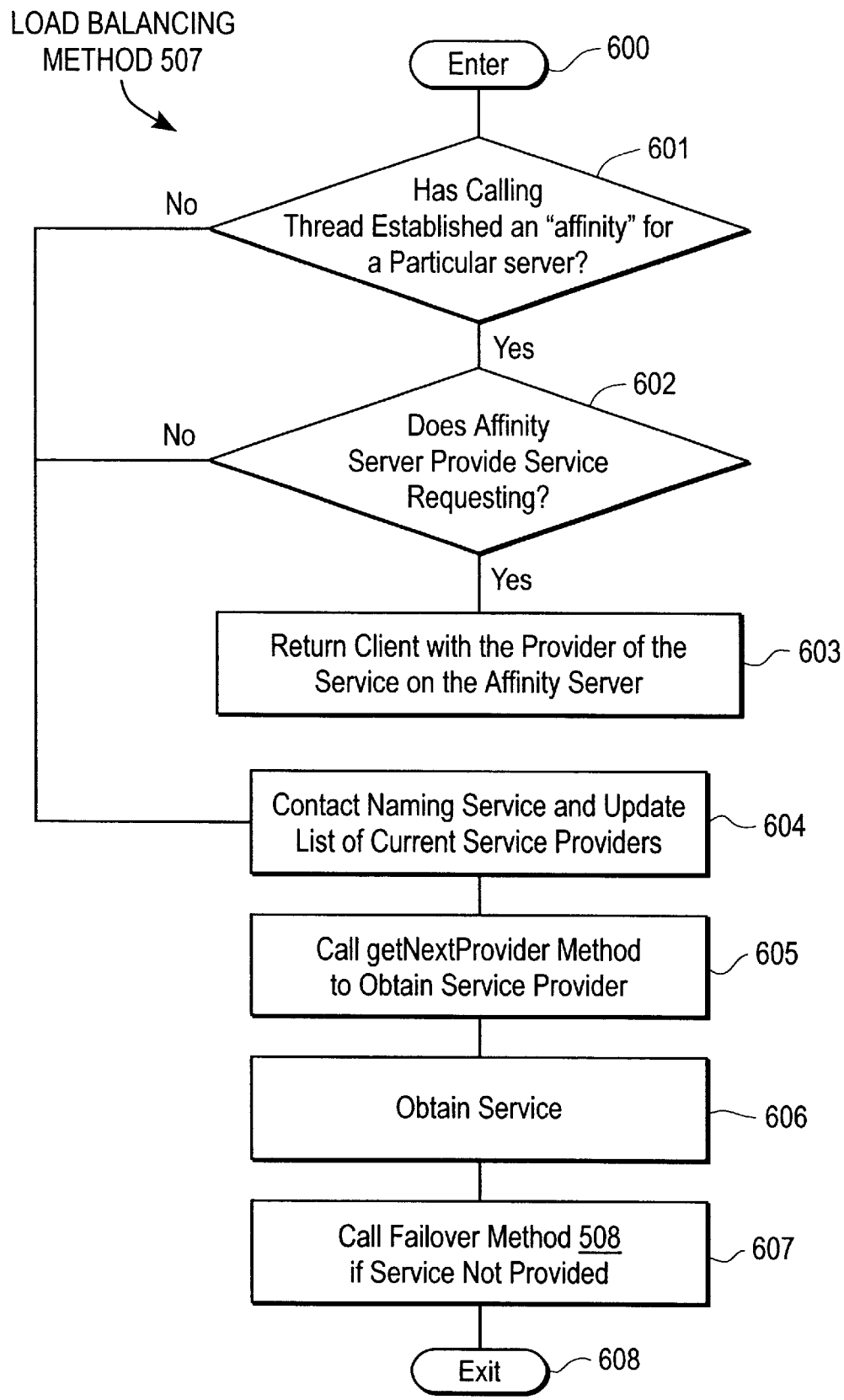
FIG. 6a is a control flow chart illustrating a load balancing method.

FIG. 6a is a control flow diagram illustrating the load balancing software 507 illustrated in FIGS. 5a–b. It should be understood that FIG. 6a is a control flow diagram illustrating the logical sequence of functions or steps which are completed by software in load balancing method 507. In alternate embodiments, additional functions or steps are completed. Further, in an alternate embodiment, hardware may perform a particular function or all the functions.

Load balancing software 507 begins as indicated by circle 600. A determination is then made in logic block 601 as to whether the calling thread established "an affinity" for a particular server. A client has an affinity for the server that coordinates its current transaction and a server has an affinity for itself. If an affinity is established, control is passed to logic block 602, otherwise control is passed to logic block 604. A determination is made in logic block 602 whether the affinity server provides the service requested. If so, control is passed to logic block 603. Otherwise, control is passed to logic block 604. The provider of the service on the affinity server is returned to the client in logic block 603. In logic block 604, a naming service is contacted and an updated list of the current service providers is obtained. A getNextProvider method is called to obtain a service provider in logic block 605. Various embodiments of the getNextProvider method are illustrated in FIGS. 6b–g and described in detail below. The service is obtained in logic block 606. Failover method 508 is then called if service is not provided in logic block 606 and load balancing method 507 exits as illustrated by logic block 608. An embodiment of failover method 508 is illustrated in FIG. 7 and described in detail below.

Figure 6B:
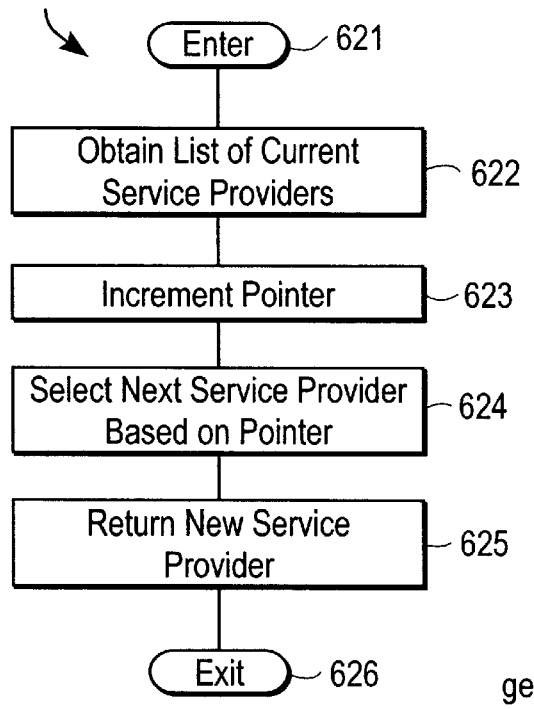
FIGS. 6b–g are control flow charts illustrating load balancing methods.

FIGS. 6b–g illustrate various embodiments of a getNextProvider method used in logic block 605 of FIG. 6a. As illustrated in FIG. 6b, the getNextProvider method selects a service provider in a round robin manner. A getNextProvider method 620 is entered as illustrated by circle 621. A list of current service providers is obtained in logic block 622. A pointer is incremented in logic block 623. The next service provider is selected based upon the pointer in logic block 624 and the new service provider is returned in logic block 625 and getNextProvider method 620 exits as illustrated by circle 626.

Figure 6C:
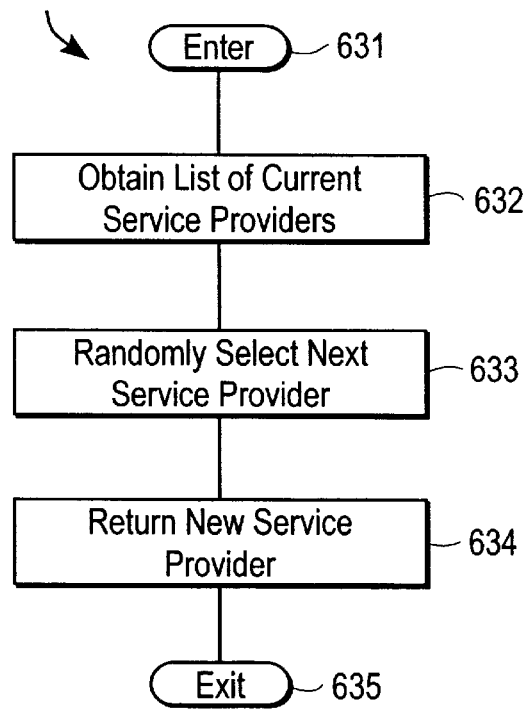
Figure 7:
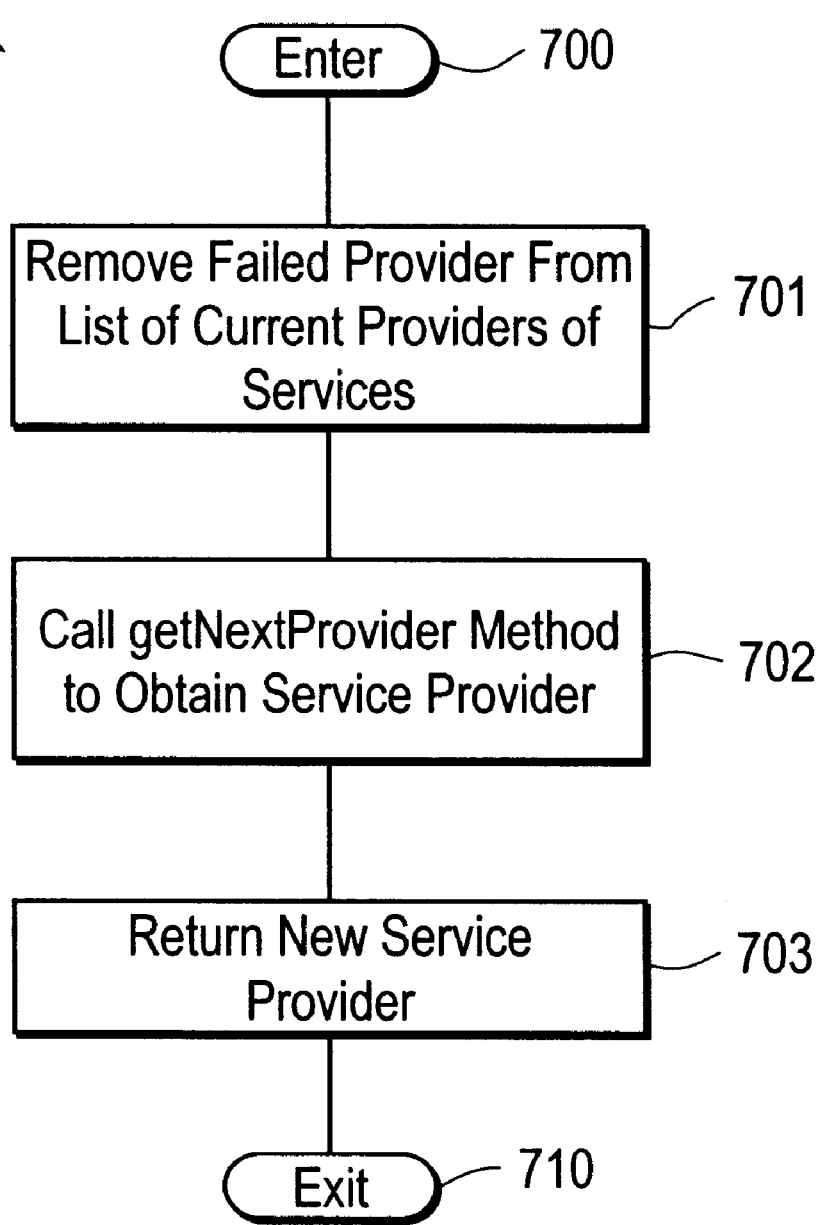
FIG. 7 is a control flow chart illustrating a failover method.

FIG. 6c illustrates an alternate embodiment of a getNextProvider method which obtains a service provider by selecting a service provider randomly. A getNextProvider method 630 is entered as illustrated by circle 631. A list of current service providers is obtained as illustrated by logic block 632. The next service provider is selected randomly as illustrated by logic block 633 and a new service provider is returned in logic block 634. The getNextProvider method 630 then exits, as illustrated by circle 635.

Figure 6D:
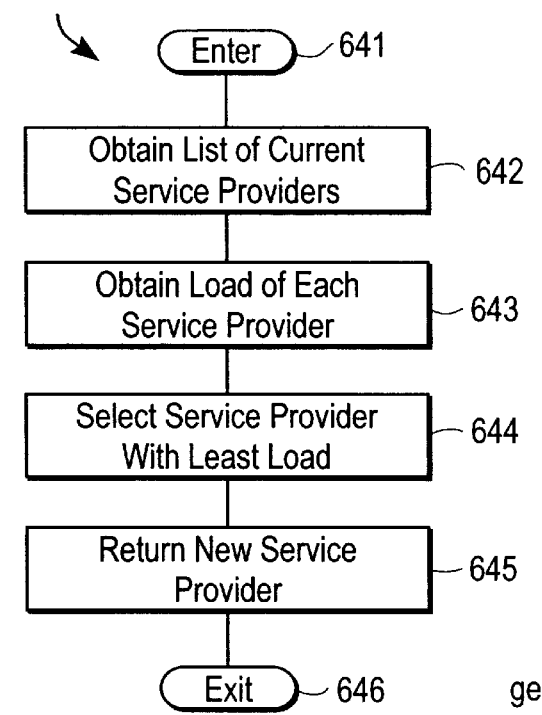

Still another embodiment of a getNextProvider method is illustrated in FIG. 6d which obtains a service provider based upon the load of the service providers. A getNextProvider method 640 is entered as illustrated by circle 641. A list of current service providers is obtained in logic block 642. The load of each service provider is obtained in logic block 643. The service provider with the least load is then selected in logic block 644. The new service provider is then returned in logic block 645 and getNextProvider method 640 exits as illustrated by circle 646.

Figure 6E:
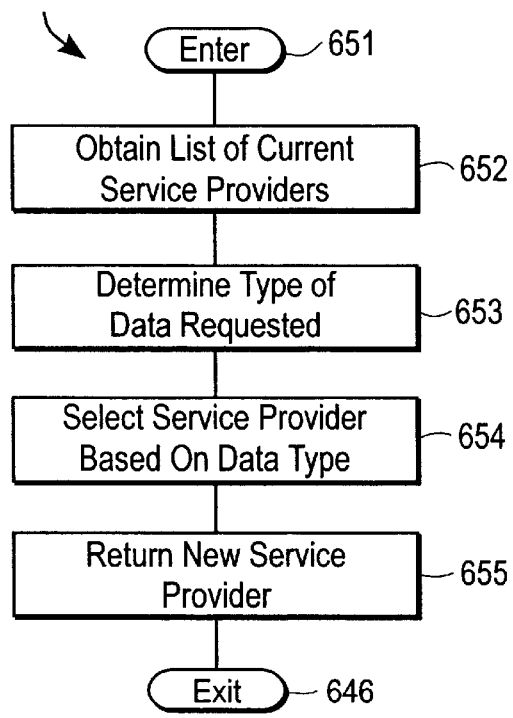

An alternate embodiment of a getNextProvider method is illustrated in FIG. 6e which obtains a service provider based upon the type of data obtained from the service provider. A getNextProvider method 650 is entered as illustrated by circle 651. A list of current service providers is obtained in logic block 652. The type of data requested from the service providers is determined in logic block 653. The service provider is then selected based on the data type in logic block 654. The service provider is returned in logic block 655 and getNextProvider method 650 exits as illustrated by circle 656.

Figure 6F:
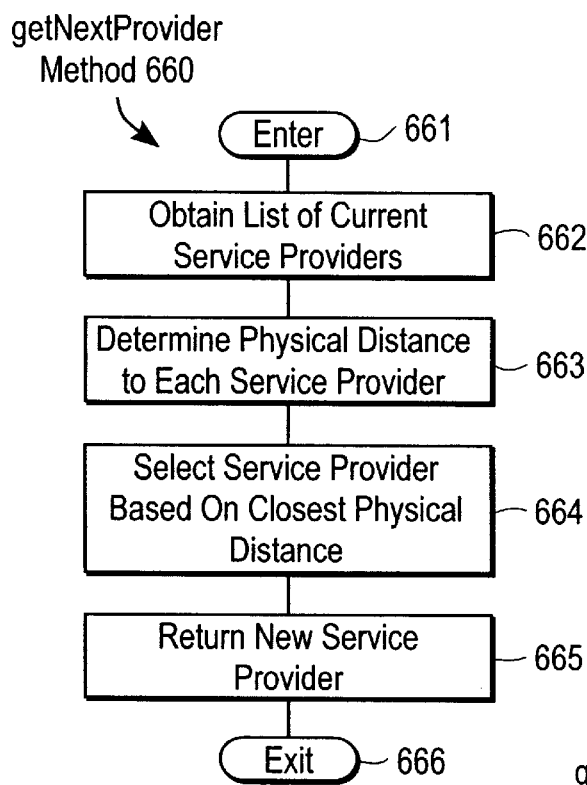

Still another embodiment of a getNextProvider method is illustrated in FIG. 6f which selects a service provider based upon the physical location of the service providers. A getNextProvider method 660 is entered as illustrated by circle 661. A list of service providers is obtained as illustrated by logic block 662. The physical distance to each service provider is determined in logic block 663 and the service provider which has the closest physical distance to the requesting client is selected in logic block 664. The new service provider is then returned in logic block 665 and the getNextProvider method 660 exits as illustrated by circle 666.

Figure 6G:
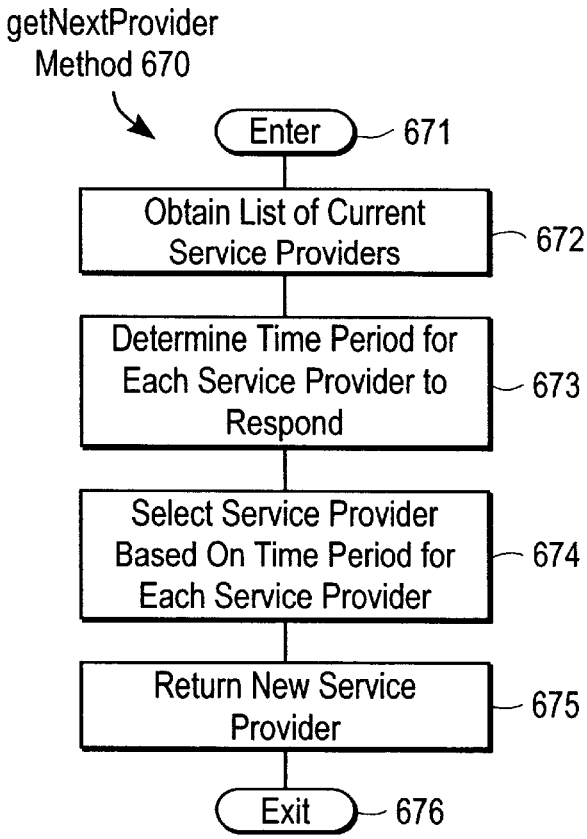

Still a further embodiment of the getNextProvider method is illustrated in FIG. 6g and selects a service provider based on the amount of time taken for the service provider to respond to previous requests. Control of getNextProvider method 670 is entered as illustrated by circle 671. A list of current service providers is obtained in logic block 672. The time period for each service provider to respond to a particular message is determined in logic block 673. The service provider which responds in the shortest time period is selected in logic block 674. The new service provider is then returned in logic block 675 and control from getNextProvider method 670 exits as illustrated by circle 676.

If invocation of a service method fails in such a way that a retry is warranted, RA 580 stub calls failover method 508, which takes the failed server and an exception indicating what the failure was and returns a new server for the retry. If a new server is unavailable, RA stub 580 throws an exception.

FIG. 7 is a control flow chart illustrating failover software 508 shown in FIGS. 5a–b. Failover method 508 is entered as illustrated by circle 700. A failed provider from the list of current providers of services is removed in logic block 701. A getNextProvider method is then called in order to obtain a service provider. The new service provider is then returned in logic block 703 and failover method 508 exits as illustrated by circle 704.

While FIGS. 6–7 illustrate embodiments of a replica handler 506, alternate embodiments include the following functions or combinations thereof implemented in a round robin manner.

First, a list of servers or service providers of a service is maintained. Whenever the list needs to be used and the list has not been recently updated, handler 506 contacts a naming service as described below and obtains an up-to-date list of providers.

Second, if handler 506 is about to select a provider from the list and there is an existing RJVM-level connection to the hosting server over which no messages have been received during the last heartbeat period, handler 506 skips that provider. In an embodiment, a server may later recover since death of peer is determined after several such heartbeat periods. Thus, load balancing on the basis of server load is obtained.

Third, when a provider fails, handler 506 removes the provider from the list. This avoids delays caused by repeated attempts to use non-working service providers.

Fourth, if a service is being invoked from a server that hosts a provider of the service, then that provider is used. This facilitates co-location of providers for chained invokes of services.

Fifth, if a service is being invoked within the scope of a transaction and the server acting as transaction coordinator hosts a provider of the service, then that provider is used. This facilitates co-location of providers within a transaction.

The failures that can occur during a method invocation may be classified as being either (1) application-related, or (2) infrastructure-related. RA stub 580 will not retry an operation in the event of an application-related failure, since there can be no expectation that matters will improve. In the event of an infrastructure-related failure, RA stub 580 may or may not be able to safely retry the operation. Some initial non-idempotent operation, such as incrementing the value of a field in a database, might have completed. In an embodiment, RA stub 580 will retry after an infrastructure failure only if either (1) the user has declared that the service methods are idempotent, or (2) the system can determine that processing of the request never started. As an example of the latter, RA stub 580 will retry if, as part of load balancing method, stub 580 switches to a service provider whose host has failed. As another example, a RA stub 580 will retry if it gets a negative acknowledgment to a transactional operation.

A RMI compiler recognizes a special flag that instructs the compiler to generate an RA stub for an object. An additional flag can be used to specify that the service methods are idempotent. In an embodiment, RA stub 580 will use the replica handler described above and illustrated in FIG. 5a. An additional flag may be used to specify a different handler. In addition, at the point a service is deployed, i.e., bound into a clustered naming service as described below, the handler may be overridden.

FIG. 5b illustrates another embodiment of the present invention in which an EJB object 551 is used instead of a stub, as shown in FIG. 5a.

III. Replicated JNDI-compliant Naming Service

Figure 4:
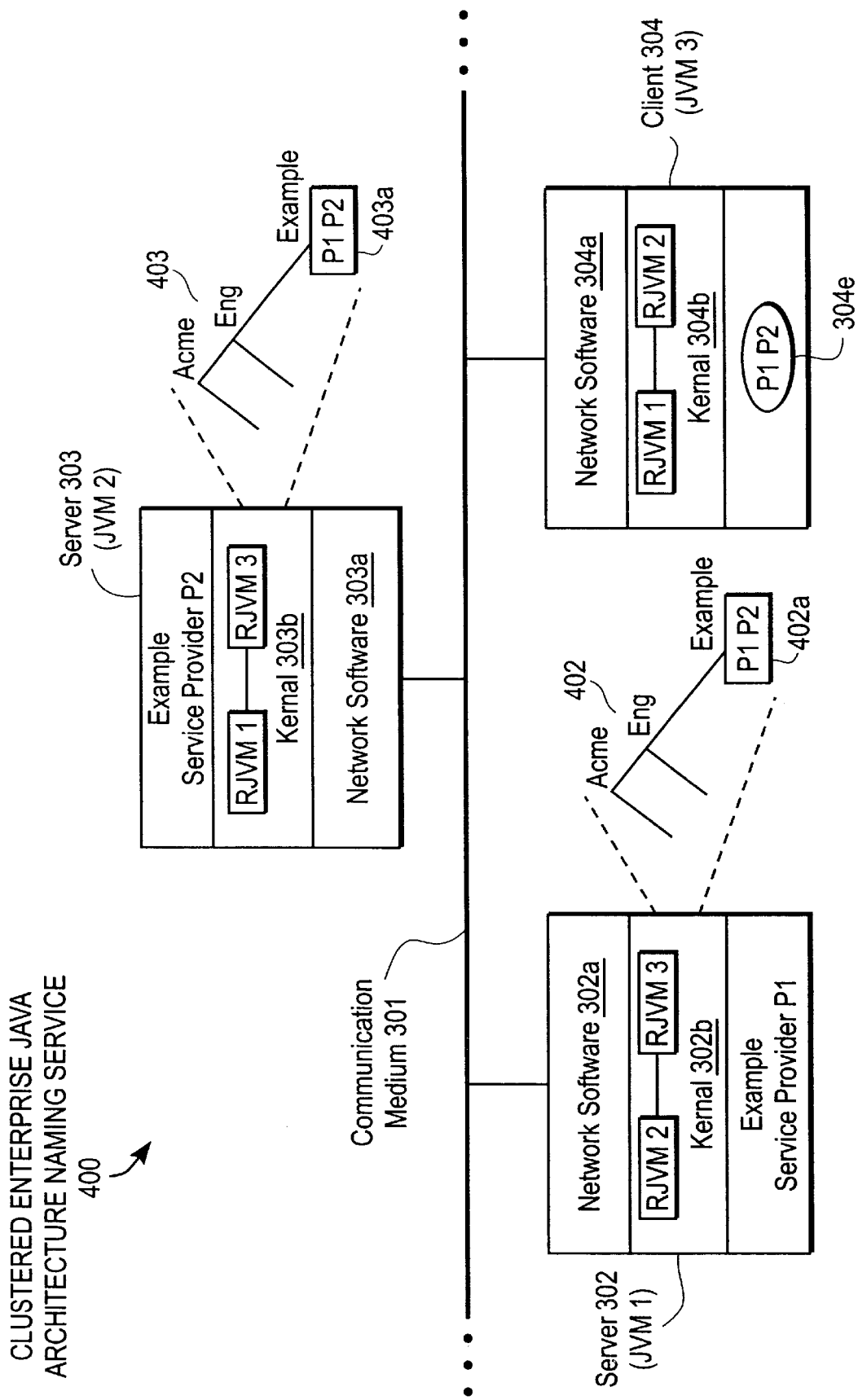
FIG. 4 illustrates a clustered enterprise Java™ naming service architecture.

As illustrated in FIG. 4, access to service providers in architecture 400 is obtained through a JNDI-compliant naming service, which is replicated across architecture 400 so there is no single point of failure. Accordingly, if a processing device which offers a JNDI-compliant naming service fails, another processing device having a replicated naming service is available. To offer an instance of a service, a server advertises a provider of the service at a particular node in a replicated naming tree. In an embodiment, each server adds a RA stub for the provider to a compatible service pool stored at the node in the server's copy of the naming tree. If the type of a new offer is incompatible with the type of offers in an existing pool, the new offer is made pending and a callback is made through a ConflictHandler interface. After either type of offer is retracted, the other will ultimately be installed everywhere. When a client looks up the service, the client obtains a RA stub that contacts the service pool to refresh the client's list of service providers.

FIG. 4 illustrates a replicated naming service in architecture 400. In an embodiment, servers 302 and 303 offer an example service provider P1 and P2, respectively, and has a replica of the naming service tree 402 and 403, respectively. The node acme.eng.example in naming service tree 402 and 403 has a service pool 402a and 403a, respectively, containing a reference to Example service provider P1 and P2. Client 304 obtains a RA stub 304e by doing a naming service lookup at the acme.eng.example node. Stub 304e contacts an instance of a service pool to obtain a current list of references to available service providers. Stub 304e may switch between the instances of a service pool as needed for load-balancing and failover.

Stubs for the initial context of the naming service are replica-aware or Smart stubs which initially load balance among naming service providers and switch in the event of a failure. Each instance of the naming service tree contains a complete list of the current naming service providers. The stub obtains a fresh list from the instance it is currently using. To bootstrap this process, the system uses Domain Naming Service ("DNS") to find a (potentially incomplete) initial list of instances and obtains the complete list from one of them. As an example, a stub for the initial context of the naming service can be obtained as follows:

Hashtable env=new Hashtable( );
env.put(Context.PROVIDER_URL, "t3://
    acmeCluster:7001");

env.put(Context.INITIAL_CONTEXT_FACTORY,
"weblogic.jndi.WebLogicInitialContextFactor");
Context ctx=new InitialContext(env);

Some subset of the servers in an architecture have been bound into DNS under the name acmeCluster. Moreover, an application is still able to specify the address of an individual server, but the application will then have a single point of failure when the application first attempts to obtain a stub.

A reliable multicast protocol is desirable. In an embodiment, provider stubs are distributed and replicated naming trees are created by an IP multicast or point-to-point protocol. In an IP multicast embodiment, there are three kinds of messages: Heartbeats, Announcements, and StateDumps. Heartbeats are used to carry information between servers and, by their absence, to identify failed servers. An Announcement contains a set of offers and retractions of services. The Announcements from each server are sequentially numbered. Each receiver processes an Announcement in order to identify lost Announcements. Each server includes in its Heartbeats the sequence number of the last Announcement it has sent. Negative Acknowledgments ("NAKs") for a lost Announcement are included in subsequent outgoing Heartbeats. To process NAKs, each server keeps a list of the last several Announcements that the server has sent. If a NAK arrives for an Announcement that has been deleted, the server sends a StateDump, which contains a complete list of the server's services and the sequence number of its next Announcement. When a new server joins an existing architecture, the new server NAKs for the first message from each other server, which results in StateDumps being sent. If a server does not receive a Heartbeat from another server after a predetermined period of time, the server retracts all services offered by the server not generating a Heartbeat.

IV. Programming Models

Applications used in the architecture illustrated in FIGS. 3–5 use one of three basic programming models: (1) stateless or direct, (2) stateless factory or indirect, or (3) stateful or targeted, depending on the way the application state is to be treated. In the stateless model, a Smart stub returned by a naming-service lookup directly references service providers.

Example e=(Example) ctx.lookup("acme.eng.example");
    result1=e.example(37);
    result2=e.example(38);

In this example, the two calls to example may be handled by different service providers since the Smart stub is able to switch between them in the interests of load balancing. Thus, the Example service object cannot internally store information on behalf of the application. Typically the stateless model is used only if the provider is stateless. As an example, a pure stateless provider might compute some mathematical function of its arguments and return the result. Stateless providers may store information on their own behalf, such as for accounting purposes. More importantly, stateless providers may access an underlying persistent storage device and load application state into memory on an as-needed basis. For example, in order for example to return the running sum of all values passed to it as arguments, example might read the previous sum from a database, add in its current argument, write the new value out, and then return it. This stateless service model promotes scalability.

In the stateless factory programming model, the Smart stub returned by the lookup is a factory that creates the desired service providers, which are not themselves Smart stubs.

ExampleFactory gf=(ExampleFactory) ctx.lookup("acme.eng.example");
    Example e=gf.create( );
    result1=e.example(37);
    result2=e.example(38);

In this example, the two calls to example are guaranteed to be handled by the same service provider. The service provider may therefore safely store information on behalf of the application. The stateless factory model should be used when the caller needs to engage in a "conversation" with the provider. For example, the caller and the provider might engage in a back-and-forth negotiation. Replica-aware stubs are generally the same in the stateless and stateless factory models, the only difference is whether the stubs refer to service providers or service provider factories.

A provider factory stub may failover at will in its effort to create a provider, since this operation is idempotent. To further increase the availability of an indirect service, application code must contain an explicit retry loop around the service creation and invocation.

while (true) {
      try {
        Example e=gf.create( );
        result1:=e.example(37);
        result2=e.example(38);
        break;
      } catch (Exception e) {
        if (!retryWarranted(e))
          throw e;
      }
    }

This would, for example, handle the failure of a provider e that was successfully created by the factory. In this case, application code should determine whether non-idempotent operations completed. To further increase availability, application code might attempt to undo such operations and retry.

In the stateful programming model, a service provider is a long-lived, stateful object identified by some unique system-wide key. Examples of "entities" that might be accessed using this model include remote file systems and rows in a database table. A targeted provider may be accessed many times by many clients, unlike the other two models where each provider is used once by one client. Stubs for targeted providers can be obtained either by direct lookup, where the key is simply the naming-service name, or through a factory, where the key includes arguments to the create operation. In either case, the stub will not do load balancing or failover. Retries, if any, must explicitly obtain the stub again.

There are three kinds of beans in EJB, each of which maps to one of the three programming models. Stateless session beans are created on behalf of a particular caller, but maintain no internal state between calls. Stateless session beans map to the stateless model. Stateful session beans are created on behalf of a particular caller and maintain internal state between calls. Stateful session beans map to the stateless factory model. Entity beans are singular, stateful objects identified by a system-wide key. Entity beans map to the stateful model. All three types of beans are created by a factory called an EJB home. In an embodiment, both EJB homes and the beans they create are referenced using RMI. In an architecture as illustrated in FIGS. 3–5, stubs for an EJB home are Smart stubs. Stubs for stateless session beans are Smart stubs, while stubs for stateful session beans and entity beans are not. The replica handler to use for an EJB-based service can be specified in its deployment descriptor.

To create an indirect RMI-based service, which is required if the object is to maintain state on behalf of the caller, the application code must explicitly construct the factory. A targeted RMI-based service can be created by running the RMI compiler without any special flags and then binding the resulting service into the replicated naming tree. A stub for the object will be bound directly into each instance of the naming tree and no service pool will be created. This provides a targeted service where the key is the naming-service name. In an embodiment, this is used to create remote file systems.

V. Hardware and Software Components

FIG. 8 shows hardware and software components of an exemplary server and/or client as illustrated in FIGS. 3–5. The system of FIG. 8 includes a general-purpose computer 800 connected by one or more communication mediums, such as connection 829, to a LAN 840 and also to a WAN, here illustrated as the Internet 880. Through LAN 840, computer 800 can communicate with other local computers, such as a file server 841. In an embodiment, file server 801 is server 303 as illustrated in FIG. 3. Through the Internet 880, computer 800 can communicate with other computers, both local and remote, such as World Wide Web server 881. In an embodiment, Web server 881 is server 303 as illustrated in FIG. 3. As will be appreciated, the connection from computer 800 to Internet 880 can be made in various ways, e.g., directly via connection 829, or through local-area network 840, or by modem (not shown).

Computer 800 is a personal or office computer that can be, for example, a workstation, personal computer, or other single-user or multi-user computer system; an exemplary embodiment uses a Sun SPARC-20 workstation (Sun Microsystems, Inc., Mountain View, Calif.). For purposes of exposition, computer 800 can be conveniently divided into hardware components 801 and software components 802; however, persons of ordinary skill in the art will appreciate that this division is conceptual and somewhat arbitrary, and that the line between hardware and software is not a hard and fast one. Further, it will be appreciated that the line between a host computer and its attached peripherals is not a hard and fast one, and that in particular, components that are considered peripherals of some computers are considered integral parts of other computers. Thus, for example, user I/O 820 can include a keyboard, a mouse, and a display monitor, each of which can be considered either a peripheral device or part of the computer itself, and can further include a local printer, which is typically considered to be a peripheral. As another example, persistent storage 808 can include a CD-ROM (compact disc read-only memory) unit, which can be either peripheral or built into the computer.

Hardware components 801 include a processor (CPU) 805, memory 806, persistent storage 808, user I/O 820, and network interface 825 which are coupled to bus 810. These components are well understood by those of skill in the art and, accordingly, need be explained only briefly here.

Processor 805 can be, for example, a microprocessor or a collection of microprocessors configured for multiprocessing.

Memory 806 can include read-only memory (ROM), randomaccess memory (RAM), virtual memory, or other memory technologies, singly or in combination. Persistent storage 808 can include, for example, a magnetic hard disk, a floppy disk, or other persistent read-write data storage technologies, singly or in combination. It can further include mass or archival storage, such as can be provided by CD-ROM or other large-capacity storage technology. (Note that file server 841 provides additional storage capability that processor 805 can use.)

User I/O (input/output) hardware 820 typically includes a visual display monitor such as a CRT or flat-panel display, an alphanumeric keyboard, and a mouse or other pointing device, and optionally can further include a printer, an optical scanner, or other devices for user input and output.

Network I/O hardware 825 provides an interface between computer 800 and the outside world. More specifically, network I/O 825 lets processor 805 communicate via connection 829 with other processors and devices through LAN 840 and through the Internet 880.

Software components 802 include an operating system 850 and a set of tasks under control of operating system 310, such as a Java™ application program 860 and, importantly, JVM software 354 and kernel 355. Operating system 310 also allows processor 805 to control various devices such as persistent storage 808, user I/O 820, and network interface 825. Processor 805 executes the software of operating system 310, application 860, JVM 354 and kernel 355 in conjunction with memory 806 and other components of computer system 800. In an embodiment, software 802 includes network software 302a, JVM1, RJVM2 and RJVM3, as illustrated in server 302 of FIG. 3c. In an embodiment, Java™ application program 860 is Java™ application 302c as illustrated in FIG. 3c.

Persons of ordinary skill in the art will appreciate that the system of FIG. 8 is intended to be illustrative, not restrictive, and that a wide variety of computational, communications, and information devices can be used in place of or in addition to what is shown in FIG. 8. For example, connections through the Internet 880 generally involve packet switching by intermediate router computers (not shown), and computer 800 is likely to access any number of Web servers, including but by no means limited to computer 800 and Web server 881, during a typical Web client session.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An article of manufacture including an information storage medium wherein is stored information, comprising:
   a first set of digital information, including a Java™ virtual machine with a stub having a load balancing software component for selecting a service provider from a plurality of service providers and a failover software component for removing a failed service provider from a list identifying the plurality of service providers, wherein the Java™ virtual machine with the stub is located on a client processing device,
   wherein the load balancing software selects a particular service provider, from the list of plurality of service providers, if both an affinity exists for the particular service provider and the particular service provider provides a service requested, and,
   wherein an affinity exists for a particular service provider when that particular service provider, or the server associated with the service provider, is currently participating in a transaction between either of the service provider or server and the client processing device.

2. The article of manufacture of claim 1, wherein if no affinity for a service provider exists, or if the particular service provider for which the affinity exists does not provide the service requested, then the load balancing software component selects a service provider from the list of plurality of service providers in a round robin manner.

3. The article of manufacture of claim 1, wherein if no affinity for a service provider exists, or if the particular service provider for which the affinity exists does not provide the service requested, then the load balancing software component randomly selects a service provider from the list of service providers.

4. The article of manufacture of claim 1, wherein if no affinity for a service provider exists, or if the particular service provider for which the affinity exists does not provide the service requested, then the load balancing software component selects a service provider from the list of service providers based upon the load of each service provider.

5. The article of manufacture of claim 1, wherein if no affinity for a service provider exists, or if the particular service provider for which the affinity exists does not provide the service requested, then the load balancing software component selects a service provider from the list of service providers based upon the data type requested.

6. The article of manufacture of claim 1, wherein if no affinity for a service provider exists, or if the particular service provider for which the affinity exists does not provide the service requested, then the load balancing software component selects a service provider from the list of service providers based upon the closest physical service provider.

7. The article of manufacture of claim 1, wherein if no affinity for a service provider exists, or if the particular service provider for which the affinity exists does not provide the service requested, then the load balancing software component selects a service provider from the list of service providers based upon a time period in which each service provider responds.

8. An article of manufacture including an information storage medium wherein is stored information, comprising:
   a first set of digital information, including a Java™ virtual machine with a Java™ bean object for selecting a service provider from a plurality of service providers;
   wherein the Java™ bean object has a load balancing software component that selects a particular service provider, from the plurality of service providers, if both an affinity exists for the particular service provider and the particular service provider provides a service requested, and,
   wherein an affinity exists for a particular service provider when that particular service provider, or the server associated with the service provider, is currently participating in a transaction between either of the service provider or server and the client processing device.

9. The article of manufacture of claim 8, wherein the Java™ bean object has a failover software component for removing a failed service provider from a list of service providers.

10. The article of manufacture of claim 8, wherein if no affinity for a service provider exists, or if the particular service provider for which the affinity exists does not provide the service requested, then the load balancing software component selects a service provider from the plurality of service providers in a round robin manner.

11. The article of manufacture of claim 8, wherein if no affinity for a service provider exists, or if the particular service provider for which the affinity exists does not provide the service requested, then the load balancing software component randomly selects a service provider.

12. The article of manufacture of claim 8, wherein if no affinity for a service provider exists, or if the particular service provider for which the affinity exists does not provide the service requested, then the load balancing software component selects a service provider from the plurality of service providers based upon the load of each service provider.

13. The article of manufacture of claim 8, wherein if no affinity for a service provider exists, or if the particular service provider for which the affinity exists does not provide the service requested, then the load balancing software component selects a service provider from the plurality of service providers based upon the data type requested.

14. The article of manufacture of claim 8, wherein if no affinity for a service provider exists, or if the particular service provider for which the affinity exists does not provide the service requested, then the load balancing software component selects a service provider from the plurality of service providers based upon the closest physical service provider.

15. The article of manufacture of claim 8, wherein if no affinity for a service provider exists, or if the particular service provider for which the affinity exists does not provide the service requested, then the load balancing software component selects a service provider from the plurality of service providers based upon a time period in which each service provider responds.

16. The article of manufacture of claim 8, further comprising:
   a second set of digital information, including a stateless session bean.

17. The article of manufacture of claim 8, further comprising:
   a second set of digital information, including a stateful session bean.

18. The article of manufacture of claim 8, further comprising:
   a second set of digital information, including an entity session bean.

19. An apparatus, comprising:
   a processor;
   an instruction store, coupled to the processor, comprising an article of manufacture as recited in claim 1; and
   a data store, coupled to the processor, wherein an application program can be stored.

20. An apparatus, comprising:
   a processor;
   an instruction store, coupled to the processor, comprising an article of manufacture as recited in claim 8; and
   a data store, coupled to the processor, wherein an application program can be stored.

21. A processing device implemented method, comprising the steps of:
   obtaining, by a stub, a list of service providers; and
   selecting a service provider for use in a transaction, by the stub, from the list of service providers
   wherein the selecting step includes selecting, by the stub, a particular service provider, from the list of plurality of service providers, if both an affinity exists for the particular service provider and the particular service provider provides a service requested, and,
   wherein an affinity exists for a particular service provider when that particular service provider, or the server associated with the service provider, is currently participating in the transaction.

22. The method of claim 21, wherein the list of service providers is obtained from a naming service.

23. The method of claim 21, wherein the list of service providers is obtained from a naming service.

24. The method of claim 21, wherein if no affinity for a service provider exists, or if the particular service provider for which the affinity exists does not provide the service requested, then the step of selecting further includes the step of:
  selecting a service provider, by the stub, from the list of service providers in a round robin manner.

25. The method of claim 21, wherein if no affinity for a service provider exists, or if the particular service provider for which the affinity exists does not provide the service requested, then the step of selecting further includes the step of:
  selecting a service provider, by the stub, randomly from the list of service providers.

26. The method of claim 21, wherein if no affinity for a service provider exists, or if the particular service provider for which the affinity exists does not provide the service requested, then the step of selecting further includes the steps of:
  obtaining the load of each service provider, by the stub, in the list of service providers; and,
  selecting a service provider, by the stub, based upon the load of each service provider.

27. The method of claim 21, wherein if no affinity for a service provider exists, or if the particular service provider for which the affinity exists does not provide the service requested, then the step of selecting further includes the steps of:
  determining the type of data requested; and,
  selecting a service provider, by the stub, from the list of service providers based upon the data type.

28. The method of claim 21, wherein if no affinity for a service provider exists, or if the particular service provider for which the affinity exists does not provide the service requested, then the step of selecting further includes the steps of:
  determining the physical distance to each service provider, by the stub, in the list of service providers; and,
  selecting a service provider, by the stub, from the list of service providers based upon on the closest physical distance to the service provider.

29. The method of claim 21, wherein if no affinity for a service provider exists, or if the particular service provider for which the affinity exists does not provide the service requested, then the step of selecting further includes the steps of:
  determining a time period for each service provider, by the stub, in the list of service providers to respond; and,
  selecting a service provider from the list of service providers based upon the time period for each service provider to respond.

30. A processing device implemented method, comprising:
  obtaining a calling thread;
  determining, by a client, if the calling thread has an affinity for a server, wherein an affinity exists for a particular server when that particular server is currently participating in a transaction between the server and the client;
  determining if the server provides a service;
  obtaining a list of services, wherein the service is in the list of services providers; and,
  attempting to obtain the service.

31. The method of claim 30, further comprising:
  obtaining a failover method if the service is not available.

32. The method of claim 31, wherein the failover method obtains a next service provider in the list of service providers.

33. The method of claim 31, wherein the failover method obtains a randomly selected service provider in the list of service providers.

34. The method of claim 31, wherein the failover method obtains a service provider with the least load in the list of service providers.

35. The method of claim 31, wherein the failover method obtains a service provider based on a data type in the list of service providers.

36. The method of claim 31, wherein the failover method obtains a service provider based on the closest physical distance to the service provider.

37. The method of claim 31, wherein the failover method obtains a service provider based on a time for a response from a service provider in the plurality of service providers.

38. A method of providing failover in a distributed processing system, to select which service provider within a plurality of service providers should respond to a request from a client to access a service, the method comprising the steps of:
  determining whether the client has an affinity for a particular service provider within the plurality of service providers;
  if the client does have an affinity for a particular service provider then the substeps of
    determining whether the particular service provider can provide the service requested, and,
    returning the name of that service provider to the client;
  if the client does not have an affinity for a particular service provider, or if the particular service provider is no longer available to provide the service requested, then the substeps of
    selecting a new service provider from the plurality of service providers, and,
    returning the name of the new service provider to the client; and,
  allowing the client to access the service using the named service provider, if the named service provider exists and can provide the service.

39. The method of claim 38 wherein said step (B) of determining whether the client has an affinity for a particular service provider includes determining which service provider is coordinating the current transaction between the client and the server, and identifying that service provider as the particular service provider which the client has an affinity for.

40. The method of claim 38 wherein said step of selecting a new service provider includes selecting a new service provider from a list of service providers.

41. The method of claim 38 wherein said step of selecting a new service provider includes selecting a service provider from a list of service providers which is maintained by a naming service.

42. The method of claim 38 wherein said step of selecting a new service provider includes calling a get.next.provider function to obtain and select the next service provider on the list of service providers.

43. The method of claim 38 further comprising, following said step (D) of allowing the client to request service from the named service provider, the additional steps of:
(E) if the named service provider does not exist or cannot provide the service, then calling a failover method that includes the substeps of
identifying the named service provider as a failed service provider,
selecting a failover service provider from the plurality of service providers, and,
returning the name of the failover service provider to the client.

44. The method of claim 38 further comprising the step of:
removing the failed service provider from a list of available service providers within the distributed processing system.

45. The method of claim 38 wherein the service is a database or file system.

46. The method of claim 38, wherein if no affinity for a service provider exists, or if the particular service provider for which the affinity exists does not provide the service requested, then the system selects a service provider from the list of plurality of service providers in a round robin manner.

47. The method of claim 38, wherein if no affinity for a service provider exists, or if the particular service provider for which the affinity exists does not provide the service requested, then the system randomly selects a service provider from the list of service providers.

48. The method of claim 38, wherein if no affinity for a service provider exists, or if the particular service provider for which the affinity exists does not provide the service requested, then the system selects a service provider from the list of service providers based upon the load of each service provider.

49. The method of claim 38, wherein if no affinity for a service provider exists, or if the particular service provider for which the affinity exists does not provide the service requested, then the system selects a service provider from the list of service providers based upon the data type requested.

50. The method of claim 38, wherein if no affinity for a service provider exists, or if the particular service provider for which the affinity exists does not provide the service requested, then the system selects a service provider from the list of service providers based upon the closest physical service provider.

51. The method of claim 38, wherein if no affinity for a service provider exists, or if the particular service provider for which the affinity exists does not provide the service requested, then the system selects a service provider from the list of service providers based upon a time period in which each service provider responds.

52. A method of using load balancing and/or failover in a distributed processing system to select which a service provider within a plurality of service providers can respond to a transaction request from a client to access a service, the method comprising the steps of:
(A) receiving a transaction request from a client to access a service;
(B) determining whether the client has an affinity for a particular service provider within said plurality of service providers;
(C1) if the client does have an affinity for a particular service provider then the substeps of
determining whether the particular service provider can provide the service requested, and,
returning the name of the particular service provider to the client for use by the client in accessing the service;
(C2) if the client does not have an affinity for a particular service provider, then the substeps of
selecting a new service provider from the plurality of service providers,
determining whether the new service provider can provide the service requested, and,
returning the name of the new service provider to the client for use by the client in accessing the service; and,
(D) allowing the client to request service from the named service provider, if the named service provider is available and can provide access to the service requested.

53. The method of claim 52 wherein said step (B) of determining whether the client has an affinity for a particular service provider includes determining which service provider is coordinating the current transaction between the client and the server, and identifying that service provider as the particular service provider which the client has an affinity for.

54. The method of claim 52 wherein said step of selecting a new service provider includes selecting a new service provider from a list of service providers.

55. The method of claim 52 wherein said step of selecting a new service provider includes selecting a service provider from a list of service providers which is maintained by a naming service.

56. The method of claim 52 wherein said step of selecting a new service provider includes calling a get.next.provider function to obtain and select the next service provider on the list of service providers.

57. The method of claim 52 further comprising, following said step (D) of allowing the client to request service from the named service provider, the additional steps of:
(E) if the named service provider does not exist or cannot provide the service, then calling a failover method that includes the substeps of
identifying the named service provider as a failed service provider,
selecting a failover service provider from the plurality of service providers, and,
returning the name of the failover service provider to the client.

58. The method of claim 52 further comprising the step of:
removing the failed service provider from a list of available service providers within the distributed processing system.

59. The method of claim 52 wherein the service is a database or file system.

60. The method of claim 52, wherein if no affinity for a service provider exists, or if the particular service provider for which the affinity exists does not provide the service requested, then the system selects a service provider from the list of plurality of service providers in a round robin manner.

61. The method of claim 52, wherein if no affinity for a service provider exists, or if the particular service provider for which the affinity exists does not provide the service requested, then the system randomly selects a service provider from the list of service providers.

62. The method of claim 52, wherein if no affinity for a service provider exists, or if the particular service provider for which the affinity exists does not provide the service requested, then the system selects a service provider from the list of service providers based upon the load of each service provider.

63. The method of claim 52, wherein if no affinity for a service provider exists, or if the particular service provider for which the affinity exists does not provide the service requested, then the system selects a service provider from the list of service providers based upon the data type requested.

64. The method of claim 52, wherein if no affinity for a service provider exists, or if the particular service provider for which the affinity exists does not provide the service requested, then the system selects a service provider from the list of service providers based upon the closest physical service provider.

65. The method of claim 52, wherein if no affinity for a service provider exists, or if the particular service provider for which the affinity exists does not provide the service requested, then the system selects a service provider from the list of service providers based upon a time period in which each service provider responds.

66. A system for load balancing and failover of requests by a client to access a service in a distributed processing system comprising:

a handler for receiving requests from a client to access a service;

a plurality of service providers for providing client access to the service;

software code that performs the method of determining whether the client has an affinity for a particular service provider within the plurality of service providers;

if the client does have an affinity for a particular service provider then the substeps of determining whether the particular service provider can provide the service requested, and, returning the name of that service provider to the client;

if the client does not have an affinity for a service provider, then the substeps of selecting a new service provider from the plurality of service providers, and, returning the name of the new service provider to the client; and, allowing the client to access the service using the named service provider, if the named service provider exists and can provide the service.

67. The system of claim 66 further comprising:

a list of currently available service providers, and, wherein a failed service provider is removed from the list of service providers.

68. The system of claim 66 wherein the service is a database or file system.

69. The system of claim 66, wherein if no affinity for a service provider exists, or if the particular service provider for which the affinity exists does not provide the service requested, then the system selects a service provider from the list of plurality of service providers in a round robin manner.

70. The system of claim 66, wherein if no affinity for a service provider exists, or if the particular service provider for which the affinity exists does not provide the service requested, then the system randomly selects a service provider from the list of service providers.

71. The system of claim 66, wherein if no affinity for a service provider exists, or if the particular service provider for which the affinity exists does not provide the service requested, then the system selects a service provider from the list of service providers based upon the load of each service provider.

72. The system of claim 66, wherein if no affinity for a service provider exists, or if the particular service provider for which the affinity exists does not provide the service requested, then the system selects a service provider from the list of service providers based upon the data type requested.

73. The system of claim 66, wherein if no affinity for a service provider exists, or if the particular service provider for which the affinity exists does not provide the service requested, then the system selects a service provider from the list of service providers based upon the closest physical service provider.

74. The system of claim 66, wherein if no affinity for a service provider exists, or if the particular service provider for which the affinity exists does not provide the service requested, then the system selects a service provider from the list of service providers based upon a time period in which each service provider responds.

* * * * *

UNITED STATES PATENT AND TRADEMARK OFFICE
CERTIFICATE OF CORRECTION

PATENT NO. : 6,581,088 B1
DATED : June 17, 2003
INVENTOR(S) : Dean B. Jacobs and Eric M. Halpern It is certified that error appears in the above-identified patent and that said Letters Patent is hereby corrected as shown below:

<u>Colunn 21,</u>
Lines 3 and 4, please replace Claim 22 with the following:

22. The method of claim 21, further comprising the step of: removing a failed service provider, by the stub, from the list of service providers.

Signed and Sealed this

Seventh Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,581,088 B1 Page 1 of 1
DATED : June 17, 2003
INVENTOR(S) : Dean Bernard Jacobs and Eric M. Halpern It is certified that error appears in the above-identified patent and that said Letters Patent is hereby corrected as shown below:

<u>Title page,</u>
Item [73], Assignee: "Beas Systems, Inc." should be -- BEA SYSTEMS, INC. --.

Signed and Sealed this

Tenth Day of August, 2004

JON W. DUDAS
*Acting Director of the United States Patent and Trademark Office*